United States Patent
Nakano et al.

(10) Patent No.: US 10,630,522 B2
(45) Date of Patent: Apr. 21, 2020

(54) COMMUNICATION SYSTEM, COMMUNICATION DEVICE, AND COMMUNICATION METHOD

(71) Applicant: RENESAS ELECTRONICS CORPORATION, Tokyo (JP)

(72) Inventors: Hirofumi Nakano, Tokyo (JP); Yoshitaka Shibuya, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/246,994

(22) Filed: Jan. 14, 2019

(65) Prior Publication Data

US 2019/0253297 A1  Aug. 15, 2019

(30) Foreign Application Priority Data

Feb. 9, 2018  (JP) .................................. 2018-021964

(51) Int. Cl.
*H04L 27/26* (2006.01)
*H04B 1/40* (2015.01)
*H04B 1/04* (2006.01)

(52) U.S. Cl.
CPC ....... *H04L 27/2628* (2013.01); *H04B 1/0475* (2013.01); *H04B 1/40* (2013.01); *H04L 27/2646* (2013.01); *H04B 2001/0441* (2013.01)

(58) Field of Classification Search
CPC .... H04L 27/2628; H04L 27/2646; H04B 1/40
See application file for complete search history.

(56) References Cited

U.S. PATENT DOCUMENTS

| | | | | |
|---|---|---|---|---|
| 5,297,069 A | * | 3/1994 | Asato | ..................... H03H 17/06 708/319 |
| 5,461,582 A | * | 10/1995 | Peng | .................. H03H 17/0236 370/290 |
| 5,500,811 A | * | 3/1996 | Corry | ................. H03H 17/0275 708/319 |
| 6,108,681 A | * | 8/2000 | Wittig | ................ H03H 17/0225 708/319 |
| 7,804,764 B2 | | 9/2010 | Hara et al. | |
| 2004/0196085 A1 | * | 10/2004 | Shen | ...................... H03H 15/00 327/277 |

(Continued)

FOREIGN PATENT DOCUMENTS

WO  2007/015490 A1  2/2007

*Primary Examiner* — Jaison Joseph
(74) *Attorney, Agent, or Firm* — McDermott Will & Emery LLP

(57) ABSTRACT

To reduce a hardware circuit scale and a memory capacity in a communication system reducing a PAPR. A transmitter includes a transmission processing feedback type FIR filter configured to feed back data outputted from the last stage delay element of a plurality of delay elements included in an FIR filter to the first stage delay element and configured to set an initial value to a delay element in a predetermined position, of the delay elements, and performs transmission processing by using the transmission processing feedback type FIR filter. A receiver includes a reception processing feedback type FIR filter configured similarly to the transmission processing feedback type FIR filter and performs reception processing by using the reception processing feedback type FIR filter.

18 Claims, 30 Drawing Sheets

(56) References Cited

U.S. PATENT DOCUMENTS

| | | | | |
|---|---|---|---|---|
| 2006/0003723 A1* | 1/2006 | Shoulders | .............. | G01R 27/32 |
| | | | | 455/286 |
| 2008/0219147 A1* | 9/2008 | Hara | ...................... | H04H 20/33 |
| | | | | 370/210 |
| 2009/0322389 A1* | 12/2009 | Singh | .................... | H03L 7/0812 |
| | | | | 327/158 |
| 2010/0029240 A1* | 2/2010 | Lin | ........................ | H04N 5/605 |
| | | | | 455/337 |

* cited by examiner

FIG. 10
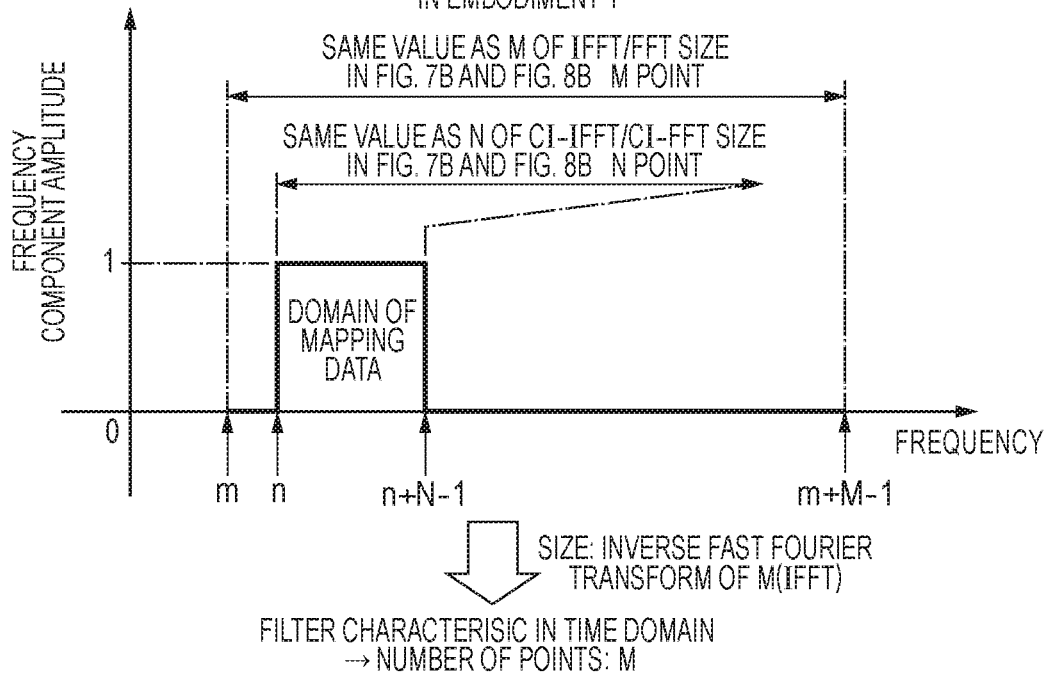
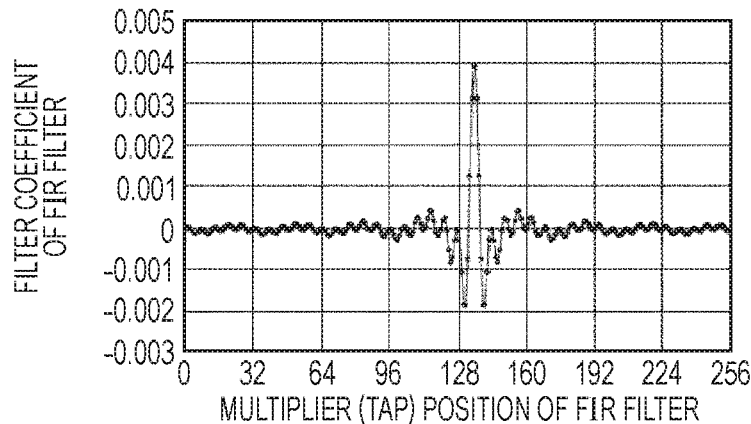
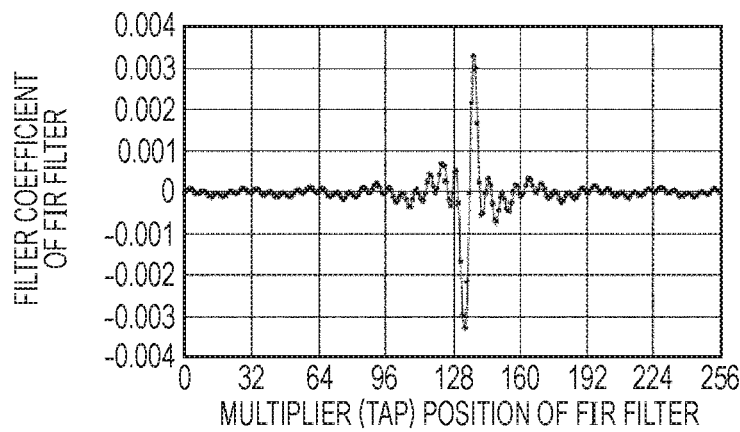

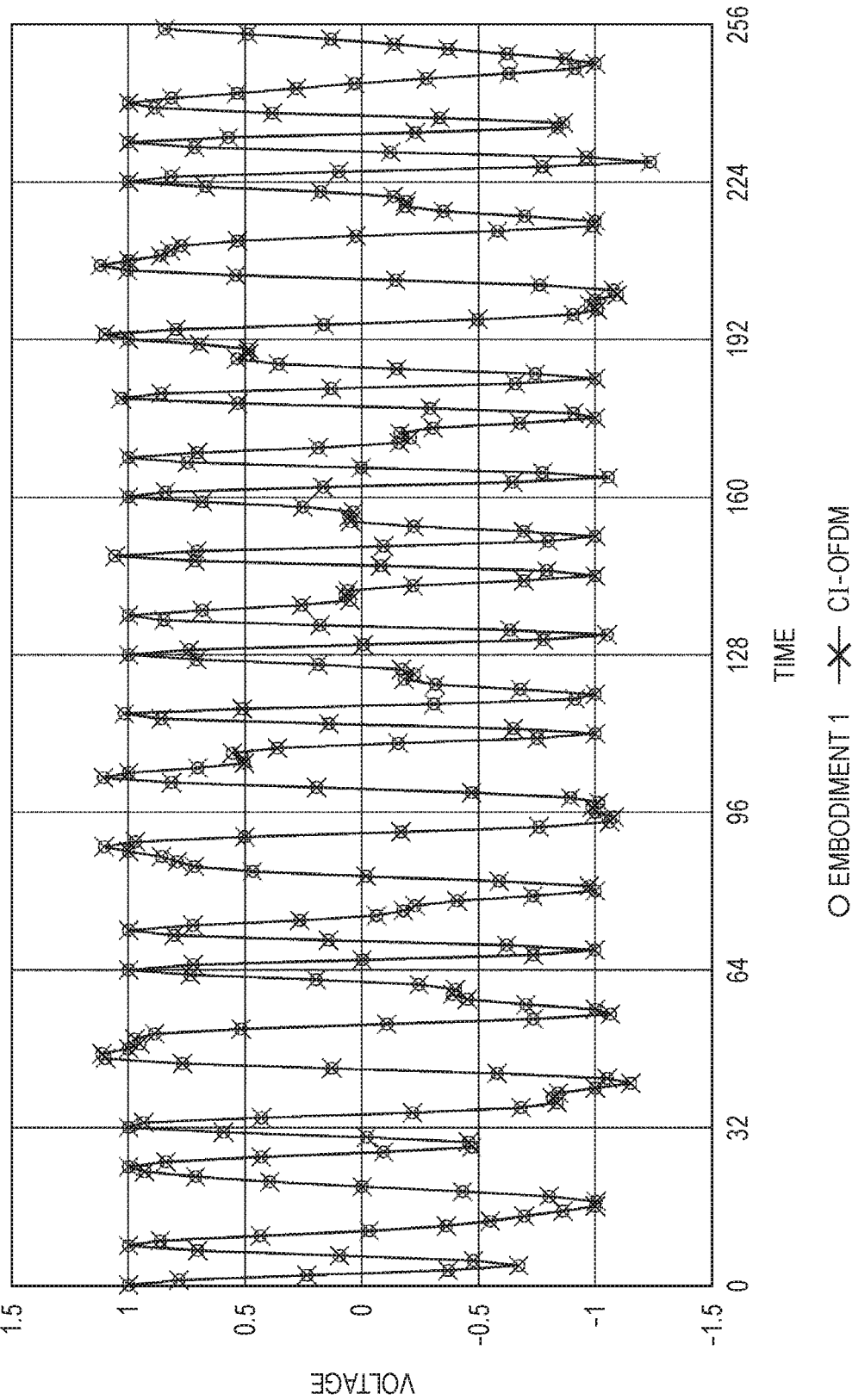

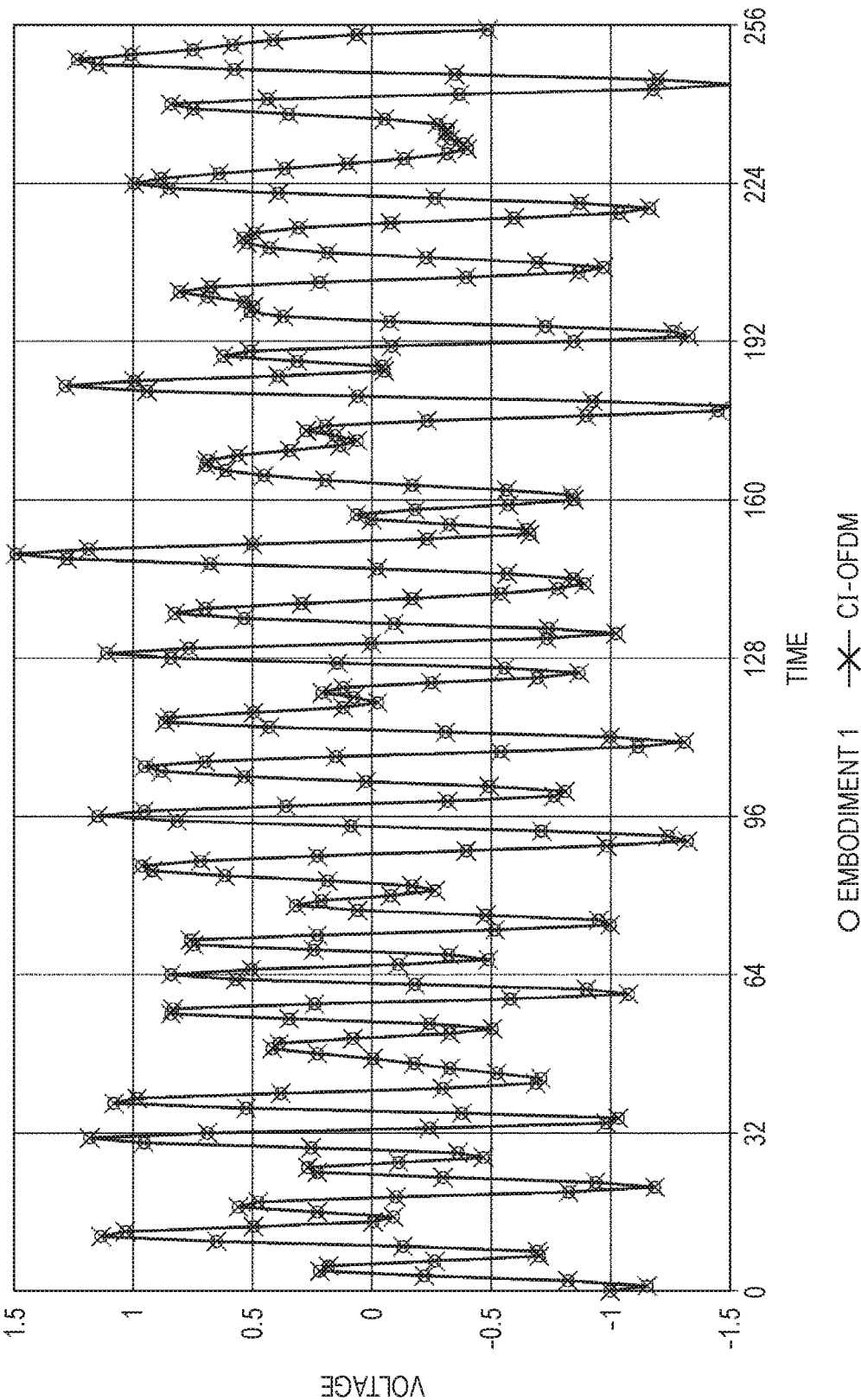

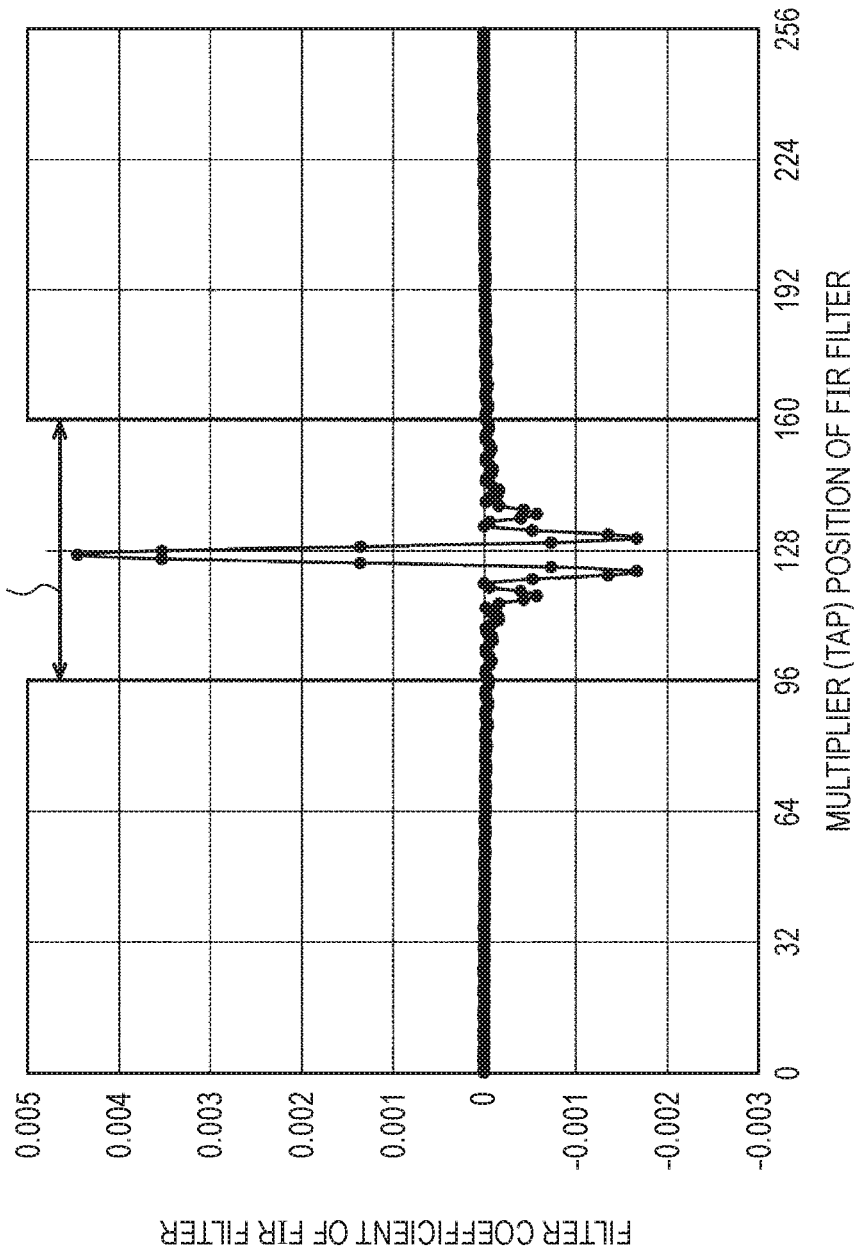

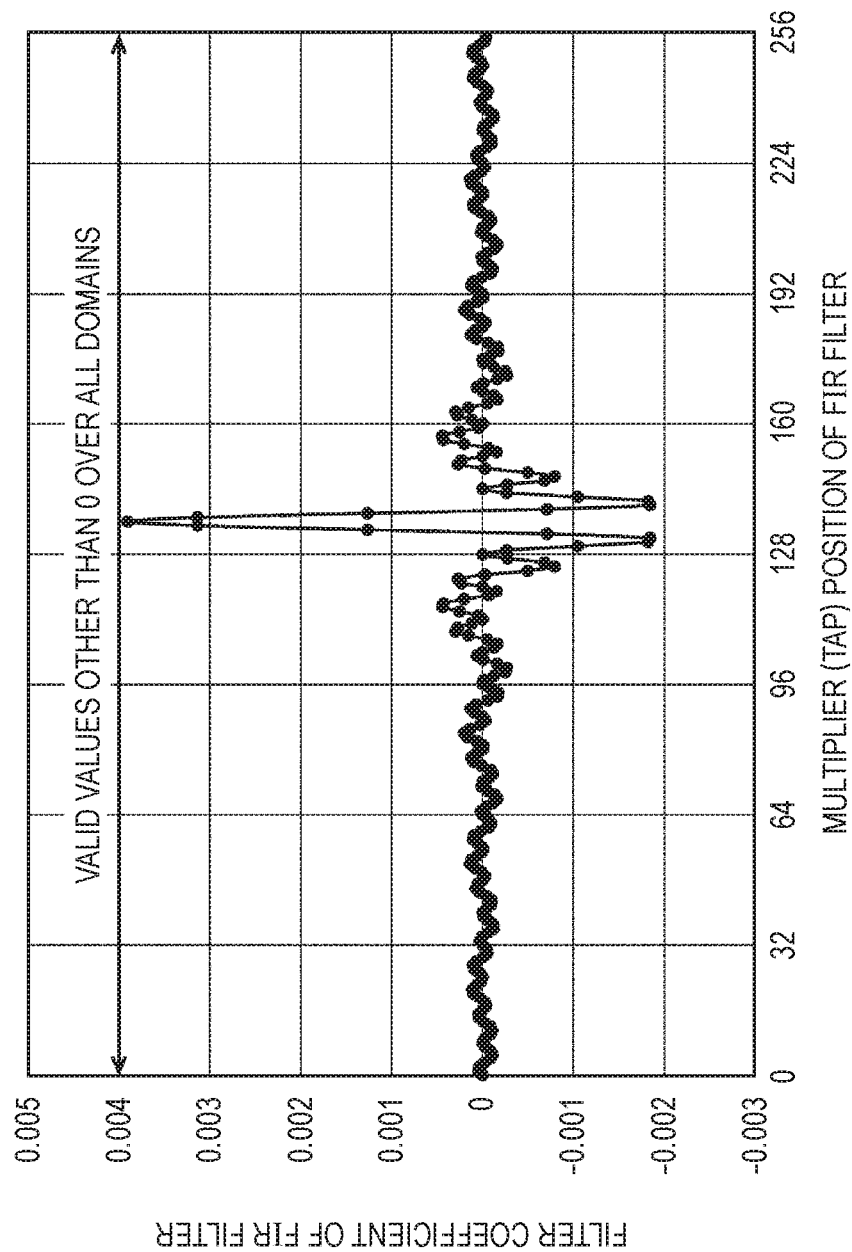

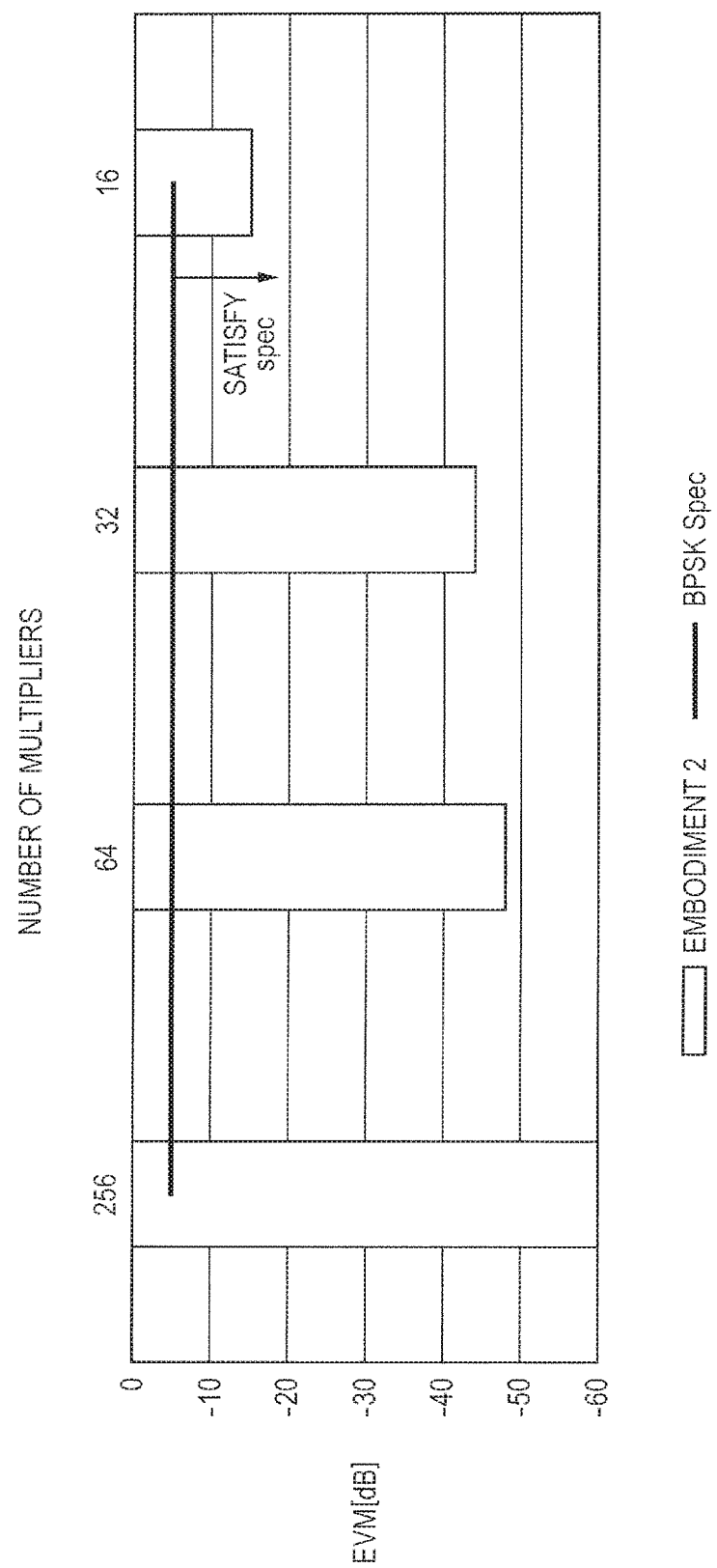

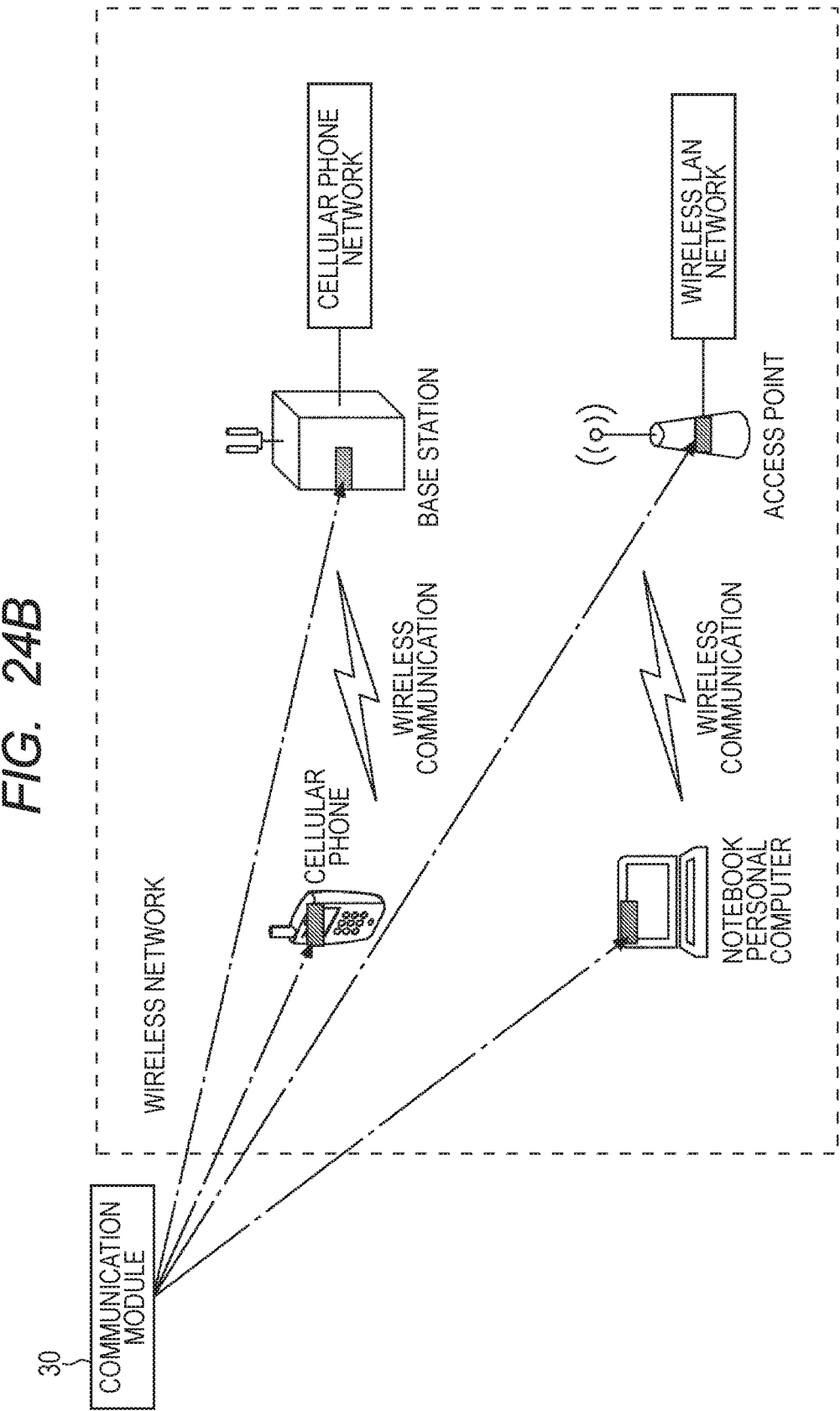

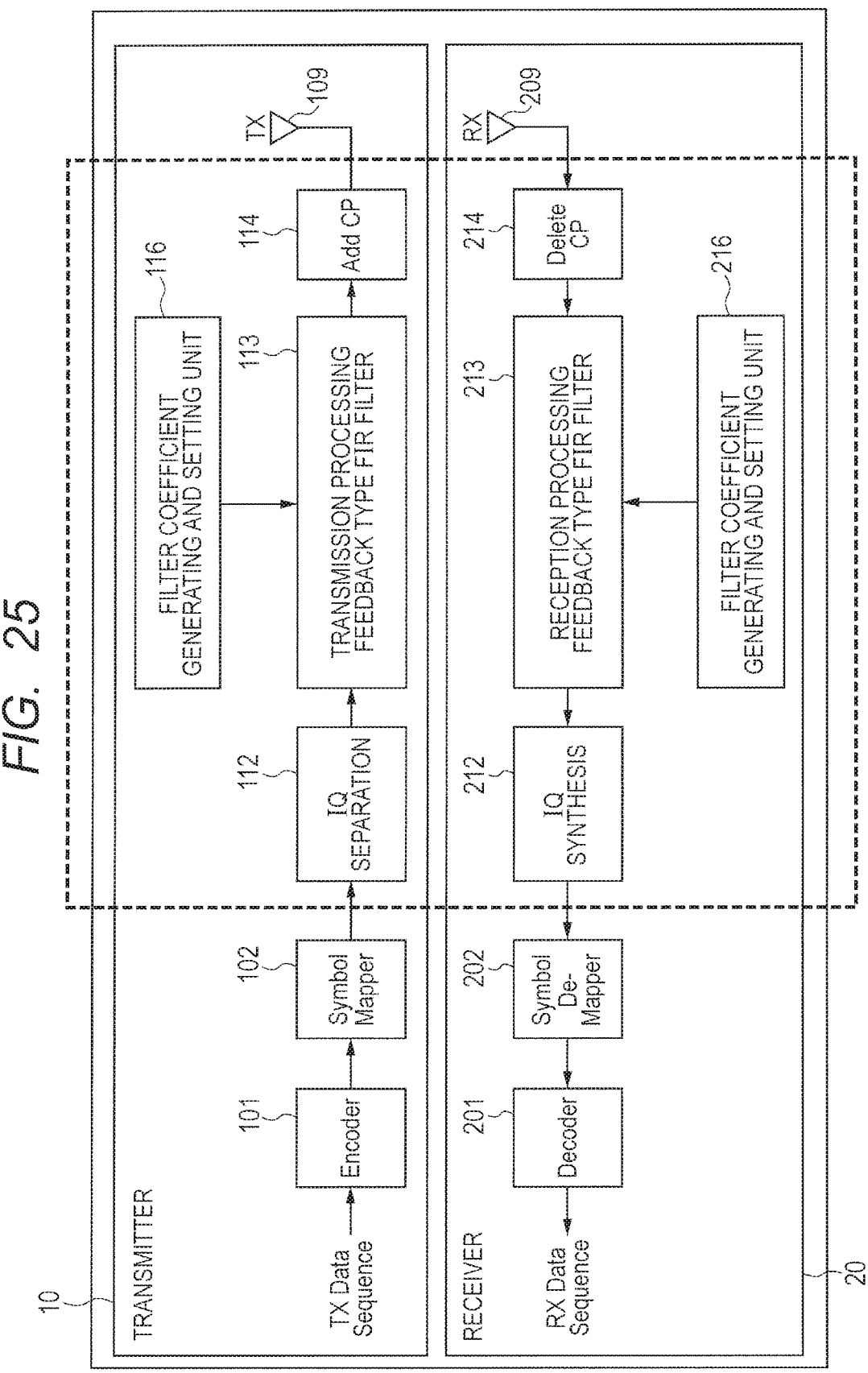

COMMUNICATION SYSTEM, COMMUNICATION DEVICE, AND COMMUNICATION METHOD

CROSS-REFERENCE TO RELATED APPLICATIONS

The disclosure of Japanese Patent Application No. 2018-021964 filed on Feb. 9, 2018 including the specification, drawings and abstract is incorporated herein by reference in its entirety.

BACKGROUND

The present invention relates to a communication system, a communication device, and a communication method.

BACKGROUND ART

As a communication system, orthogonal frequency division multiplexing (OFDM) in which information is transmitted using a plurality of subcarriers orthogonal to each other has been used in various communication standards irrespective of wire or wireless.

Since the plural subcarriers are used in the OFDM, a very large power peak is generated in a time at which the power peaks of the subcarriers are synchronized with each other (overlapped in timing). Therefore, the OFDM has a problem in that a PAPR (Peak to Average Power Ratio) becomes high.

Various techniques have been proposed to reduce the PAPR. One of them is a CI code (Carrier Interferometry (CI) code). An OFDM system to which the CI code is applied will hereinafter be called a CI-OFDM system.

The CI code is represented by such a matrix of (N×N) (N is variable by application system) as shown below. In the OFDM system, the purpose of applying the CI code is to shift the power peak phases of a plurality of subcarriers to be used to thereby prevent the power peaks of the subcarriers from being synchronized, suppress the power peaks and reduce the PAPR.

$$CI_{N\times N} = \begin{pmatrix} 1 & 1 & \cdots & 1 & 1 \\ 1 & e^{j\frac{2\pi}{N}1\cdot 1} & \cdots & e^{j\frac{2\pi}{N}(N-2)\cdot 1} & e^{j\frac{2\pi}{N}(N-1)\cdot 1} \\ \vdots & \vdots & \ddots & \vdots & \vdots \\ 1 & e^{j\frac{2\pi}{N}1\cdot(N-2)} & \cdots & e^{j\frac{2\pi}{N}(N-2)\cdot(N-2)} & e^{j\frac{2\pi}{N}(N-1)\cdot(N-2)} \\ 1 & e^{j\frac{2\pi}{N}1\cdot(N-1)} & \cdots & e^{j\frac{2\pi}{N}(N-2)\cdot(N-1)} & e^{j\frac{2\pi}{N}(N-1)\cdot(N-1)} \end{pmatrix}$$

However, since the above CI-OFDM system is complex in calculation and large in the number of times of calculation due to the use of the matrix, it is not easy to design the CI-OFDM system. Therefore, the CI-OFDM system using the matrix is theoretically possible but is not brought into practical use.

Thus, Patent Document 1 has found that the matrix calculation of the CI code can be realized by IFFT (Inverse Fast Fourier Transform)/FFT, and has proposed a technique capable of easily calculating the CI code by using the existing software equipped with an IFFT/FFT function.

RELATED ART DOCUMENTS

[Patent Document]
[Patent Document 1] International Publication No. 2007/015490

SUMMARY

The CI-OFDM system proposed by Patent Document 1 is however accompanied by a problem related to IFFT/FFT, i.e., a problem that a hardware circuit scale and a memory capacity become large because IFFT/FFT is used.

Other objects and novel features of the present invention will become apparent from the description of the present specification and the accompanying drawings.

According to one aspect of the present invention, a transmitter performs transmission processing by using a transmission processing feedback type FIR filter. A receiver performs reception processing by using a reception processing feedback type FIR filter. Each of the transmission processing feedback type FIR filter and the reception processing feedback type FIR filter is configured to feed back data outputted from the last stage delay element of a plurality of delay elements included in the FIR filter to the first stage delay element and configured to set an initial value to a delay element in a predetermined position, of the plural delay elements.

According to the one aspect of the present invention, it can contribute to the solution of the above-described problems.

BRIEF DESCRIPTION OF THE DRAWINGS

FIG. 10 is a diagram showing an example of a method for generating filter coefficients of the feedback type FIR filter in the embodiment 1;

FIG. 11 is a diagram showing an example of a result of comparison between a transmission waveform of the communication system according to the embodiment 1, and a transmission waveform of the CI-OFDM system according to the related art 2 at BPSK modulation;

FIG. 12 is a diagram showing a result of comparison between a transmission waveform of the communication system according to the embodiment 1, and a transmission waveform of the CI-OFDM system according to the related art 2 at 256QAM modulation;

FIG. 16A is a diagram showing an example of a filter characteristic in a time domain of the feedback type FIR filter in the embodiment 2;

FIG. 16B is a diagram showing an example of a filter characteristic in a time domain of the feedback type FIR filter in the embodiment 1;

FIG. 17 is a diagram showing an example of the relation between the number of multipliers and EVM at BPSK modulation in a communication system according to the embodiment 2;

FIG. 24B is a diagram showing an example in which the communication systems according to the embodiments 1 through 3 are applied to a wireless network;

FIG. 25 is a block diagram showing a transmission/reception configuration of a modification of the communication system according to each of the embodiments 1 through 3.

DETAILED DESCRIPTION

Figure 1:
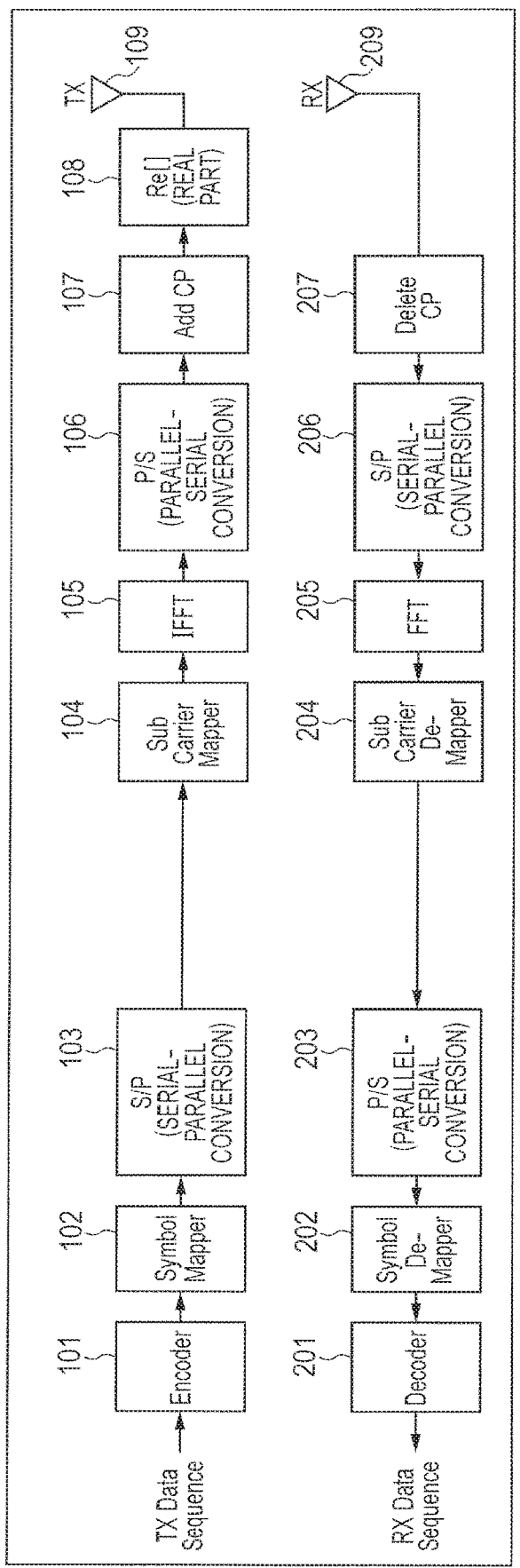
FIG. 1 is a block diagram showing an example of a transmission/reception configuration of a general OFDM system.

The following description and drawings have been omitted and simplified as appropriate for clarification of explanations. In the respective drawings, the same components are denoted by the same reference numerals, and their dual description will be omitted as needed. Further, specific numerical values, etc. to be shown below are merely illustrations for facilitating understanding of the invention, and the present invention is not limited thereto.

<Related Arts>

Related arts examined by the present inventors will be described in detail before the description of respective embodiments.

<CI-OFDM System>

The above background art has described as CI-OFDM systems, the CI-OFDM system (hereinafter called CI-OFDM system according to the related art 1) using the matrix, and the CI-OFDM system (hereinafter called CI-OFDM system according to the related art 2) proposed by Patent Document 1 (International Publication No. 2007/015490). A description will hereinafter be made about differences in calculation method and transmission/reception configuration between the CI-OFDM systems according to the related arts 1 and 2.

The difference in the calculation method therebetween will first be described.

<Calculation Method of CI Encoding of CI-OFDM System According to Related Art 1>

A CI encoding matrix (dotted line) of (N×N) is used assuming that a transmission data sequence is d (k), and a transmission data sequence after CI code application is dCI (k). k=0, 1, . . . , (N−2), and (N−1).

Therefore, multiplication and addition of (N×N) times are required to calculate dCI (k).

$$\begin{pmatrix} dCI(0) \\ dCI(1) \\ dCI(2) \\ \vdots \\ \vdots \\ \vdots \\ dCI(N-2) \\ dCI(N-1) \end{pmatrix} =$$

$$\begin{pmatrix} 1 & 1 & \cdots & 1 & 1 \\ 1 & e^{j\frac{2\pi}{N}1\cdot 1} & \cdots & e^{j\frac{2\pi}{N}(N-2)\cdot 1} & e^{j\frac{2\pi}{N}(N-1)\cdot 1} \\ \vdots & \vdots & \ddots & \vdots & \vdots \\ 1 & e^{j\frac{2\pi}{N}1\cdot(N-2)} & \cdots & e^{j\frac{2\pi}{N}(N-2)\cdot(N-2)} & e^{j\frac{2\pi}{N}(N-1)\cdot(N-2)} \\ 1 & e^{j\frac{2\pi}{N}1\cdot(N-1)} & \cdots & e^{j\frac{2\pi}{N}(N-2)\cdot(N-1)} & e^{j\frac{2\pi}{N}(N-1)\cdot(N-1)} \end{pmatrix} \begin{pmatrix} d(0) \\ d(1) \\ d(2) \\ \vdots \\ \vdots \\ d(N-2) \\ d(N-1) \end{pmatrix}$$

<Calculation Method of CI Encoding of CI-OFDM System According to Related Art 2>

Assuming that a transmission data sequence is d (k), and a transmission data sequence after CI code application is dCI (k), a CI encoding matrix is replaced by the IDFT (Inverse Discrete Fourier Transform).

Therefore, the number of calculations necessary for the calculation of dCI (k) can be set to multiplication and addition of (N×log 2N) times by calculating the IDFT by the IFFT in practical operation.

$$\begin{pmatrix} dCI(0) \\ dCI(1) \\ dCI(2) \\ \vdots \\ \vdots \\ \vdots \\ dCI(N-2) \\ dCI(N-1) \end{pmatrix} = \frac{1}{\sqrt{N}} \sum_{k=0}^{N-1} d(k) e^{j(2\pi/N)\cdot k \cdot n}$$

For example, when N=256, multiplication and addition of 256×256=65536 times was required in the calculation method by the CI-OFDM system according to the related art 1. On the other hand, the IFFT requires only multiplication and addition of 256×log$_2$(256)=256×8=2048 times.

The same applies even to decoding of each CI code. A matrix calculation is replaced by a DFT, followed by execution of the calculation by an FFT, whereby the number of calculations for the multiplication and addition can be reduced.

In the present specification, the CI encoding by the IFFT described above will subsequently be described as CI-IFFT. Further, the decoding of the CI code by the FFT described above will be described as CI-FFT.

<Transmission/Reception Configuration of CI-OFDM System According to Each of Related Arts 1 and 2>

The transmission/reception configuration of the CI-OFDM system according to each of the related arts 1 and 2 will next be described. Here, for comparison, a transmission/reception configuration of a general OFDM system will also be described together.

FIG. 1 shows a block diagram of the transmission/reception configuration of the general OFDM system.

As shown in FIG. 1, a TX data sequence is subjected to encoding processing by an encoder 101 and digital-modulated by a symbol mapper 102, followed by execution of serial-parallel conversion from serial to parallel at an S/P unit 103. Further, the TX data sequence is mapped to sub carriers at a sub carrier mapper 104 and subjected to IFFT at an IFFT unit 105, followed by execution of parallel-serial conversion from parallel to serial at a P/S unit 106. Furthermore, the TX data sequence is given a CP at the head of the TX data sequence at an add CP (Cyclic Prefix) unit 107, from which a real part is extracted at a real part (Re [ ]) extraction unit 108. Thereafter, the TX data sequence is transmitted by radio waves or wire from a TX unit 109.

An RX data sequence is received at an RX unit 209 by radio waves or wire. A CP attached to the head of the RX data sequence is deleted from the RX data sequence received by the RX unit 209 at a delete CP unit 207. Further, the RX data sequence is subjected to serial-parallel conversion at an S/P unit 206, followed by execution of the FFT by an FFT unit 205. Then, the RX data sequence is de-mapped from sub carriers at a sub carrier de-mapper 204. Furthermore, the RX data sequence is subjected to parallel-serial conversion at a P/S unit 203, followed by execution of digital demodulation by a symbol de-mapper 202, which in turn is subjected to decoding processing at a decoder 201.

Figure 2:
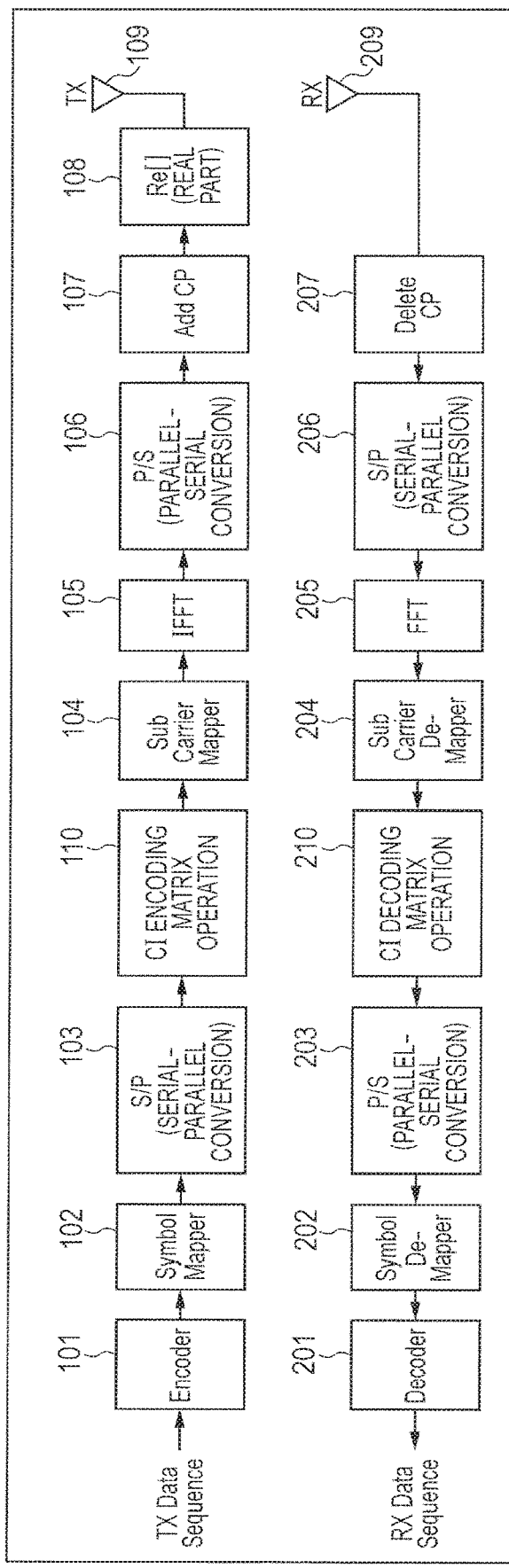
FIG. 2 is a block diagram showing an example of a transmission/reception configuration of a CI-OFDM system according to a related art 1.

FIG. 2 shows a block diagram of the transmission/reception configuration of the CI-OFDM system according to the related art 1.

As shown in FIG. 2, the CI-OFDM system according to the related art 1 has a configuration in which in the OFDM system of FIG. 1, a CI encoding matrix operation unit 110 is added between the S/P unit 103 and the sub carrier mapper 104, and a CI decoding matrix operation unit 210 is added between the sub carrier de-mapper 204 and the P/S unit 203. The CI encoding matrix operation unit 110 executes CI encoding by the above-described matrix. The CI decoding matrix operation unit 210 executes decoding of a CI code by the above-described matrix.

Figure 3:
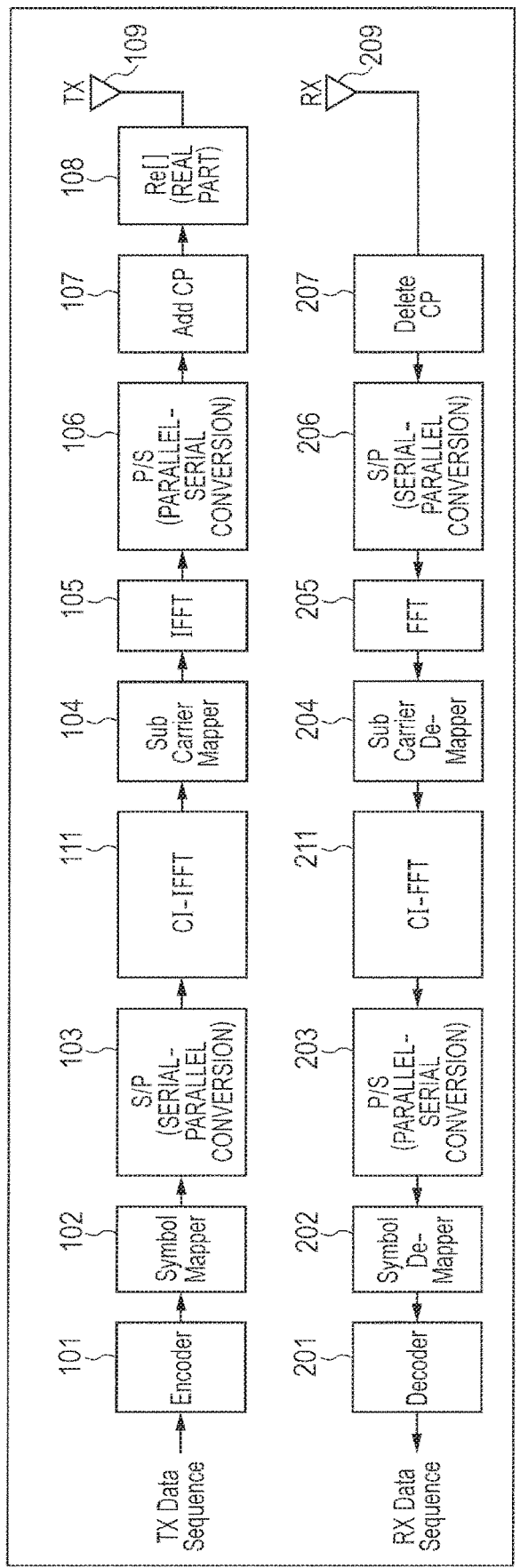
FIG. 3 is a block diagram showing an example of a transmission/reception configuration of a CI-OFDM system according to a related art 2.

FIG. 3 shows a block diagram of the transmission/reception configuration of the CI-OFDM system according to the related art 2.

As shown in FIG. 3, the CI-OFDM system according to the related art 2 has a configuration in which in the CI-OFDM system of FIG. 2, the CI encoding matrix operation unit 110 is replaced with a CI-IFFT unit 111, and the CI decoding matrix operation unit 210 is replaced with a CI-FFT unit 211. The CI-IFFT unit 111 executes the above-described CI-IFFT (CI encoding by IFFT). The CI-FFT unit 211 executes the above-described CI-FFT (decoding of CI code by FFT).

Figure 4:
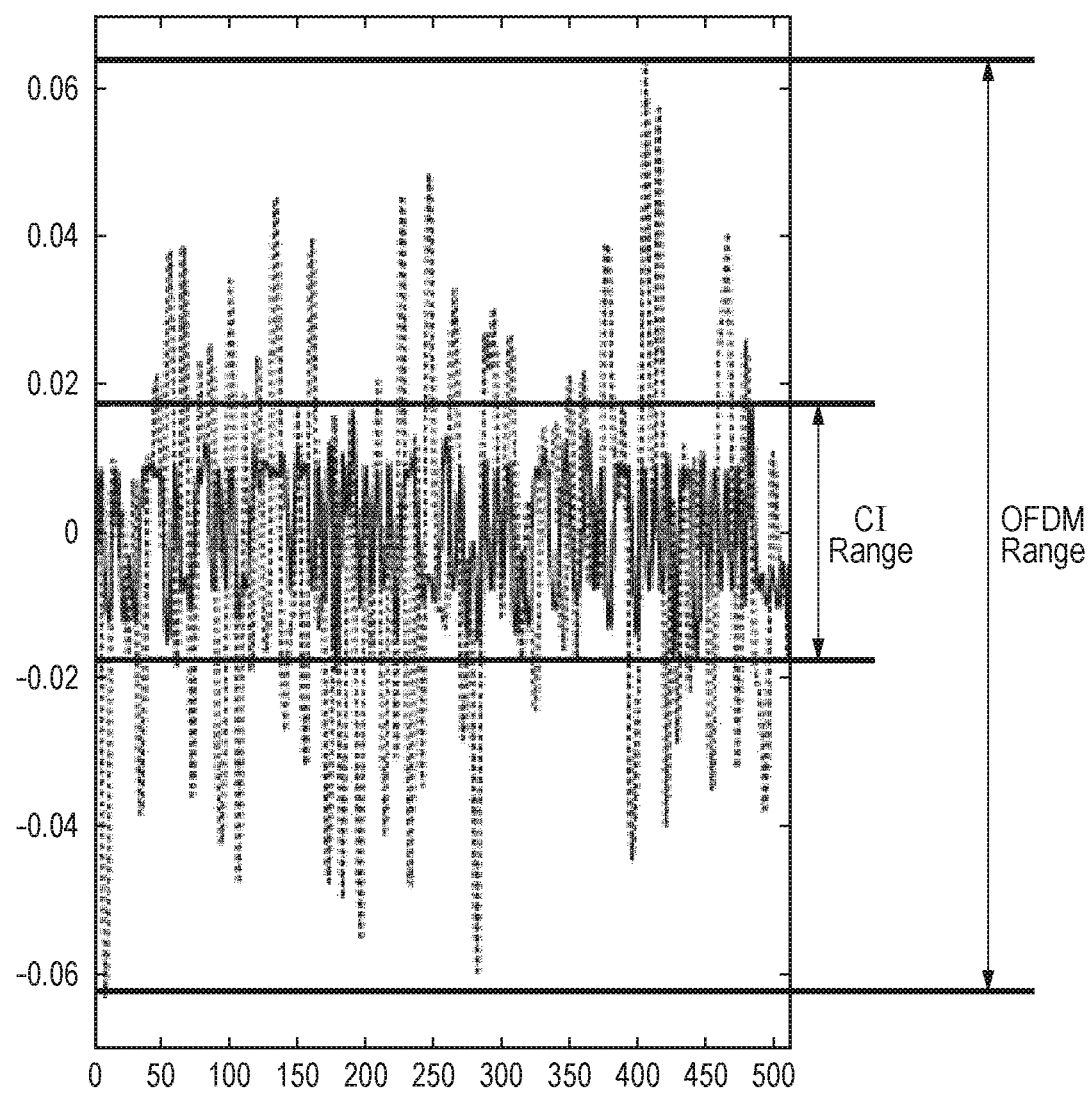
FIG. 4 is a diagram showing an example of an effect of the CI-OFDM system according to the related art 2.

FIG. 4 is a diagram showing a difference in amplitude range between transmission signal waveforms in time domains in the CI-OFDM system according to the related art 2 and the OFDM system. In FIG. 4, the vertical axis indicates the voltage, and the horizontal axis indicates the time.

As shown in FIG. 4, it is understood that when the amplitude range of the transmission signal waveform in the CI-OFDM system according to the related art 2, and the amplitude range of the transmission signal waveform in the OFDM system are compared (an OFDM Range and a CI Range in the drawing are compared), the amplitude range in the CI-OFDM system according to the related art 2 is small.

According to International Patent Publication No. 2007/015490, the following advantageous effects are obtained in terms of the CI-OFDM system according to the related art 2.

With the CI encoding/decoding taken as the IFFT/FFT processing, the number of times of multiplication and addition can be significantly reduced as compared with the configuration using the matrix.

As with the CI-OFDM system using the matrix for the CI encoding/decoding, the amplitude range becomes smaller than in the OFDM system, and hence the PAPR can be reduced.

Since, however, the IFFT/FFT is used in the CI-OFDM system according to the related art 2, problems to be described later related to the IFFT/FFT are included therein.

<IFFT/FFT>

As a related art using the IFFT/FFT, there is mentioned Japanese Unexamined Patent Application Publication No. 2006-060433.

However, the IFFT/FFT involves the following problems such as disclosed in Japanese Unexamined Patent Application Publication No. 2006-060433.

Even in the case of the IFFT operation, a logic scale is increased by using a complex multiplier.

A memory capacity causing an operation halfway result to be stored therein is increased in proportion to the number of divisions (the number of stages of butterfly operations).

That is, the IFFT/FFT has a problem that a hardware circuit scale and a memory capacity become large. This problem is included in the CI-OFDM system according to the related art 2 using the IFFT/FFT.

<Linear Type FIR Filter>

In respective embodiments to be described below, an FIR (Finite-duration Impulse-Response) filter is used as will be described later. As related arts each using the FIR filter, there are mentioned Japanese Unexamined Patent Application Publication No. 2009-033502, and Japanese Unexamined Patent Application Publication No. 2017-040895. The FIR filter used in each of Japanese Unexamined Patent Application Publication No. 2009-033502, and Japanese Unexamined Patent Application Publication No. 2017-040895 is not provided with a feedback function of feeding back data outputted from the last stage delay element to the first stage delay element. In the present specification, the FIR filter which is not equipped with such a feedback function is subsequently described as a linear type FIR filter.

The linear type FIR filter has, however, the following problem such as disclosed in Japanese Unexamined Patent Application Publication No. 2009-033502.

Since the multipliers in the FIR filter are large in circuit scale, a circuit having enormous gates is required as a whole when they are simply parallelized.

Further, the linear type FIR filter has the following problem such as disclosed in Japanese Unexamined Patent Application Publication No. 2017-040895.

When an arbitrary characteristic is realized by the FIR filter, it is necessary to perform an arithmetic operation in a high order (number of multipliers). For example, however, when the order is doubled, the amount of an arithmetic operation is also increased by double. An increase in the load of the amount of the arithmetic operation affects other processing.

That is, the linear type FIR filter has a problem in that the number of multipliers is increased in proportion to the order (number of multipliers) to enlarge a circuit scale, so that the number of times of arithmetic operations and the processing load accompanying it become large.

As described above, since the CI-OFDM system according to the related art 2 uses the IFFT/FFT, the CI-OFDM system has a problem related with the IFFT/FFT, i.e., a problem that a hardware circuit scale and a memory capacity become large.

Further, the linear type FIR filter has a problem in that the number of multipliers is increased in proportion to the order (number of multipliers) to enlarge a circuit scale, so that the number of times of arithmetic operation and the processing load associated with it become large.

The respective embodiments to be described below solve any of the above problems.

Embodiment 1

<Configuration of Embodiment 1>

<Configuration of Communication System>

Figure 5:
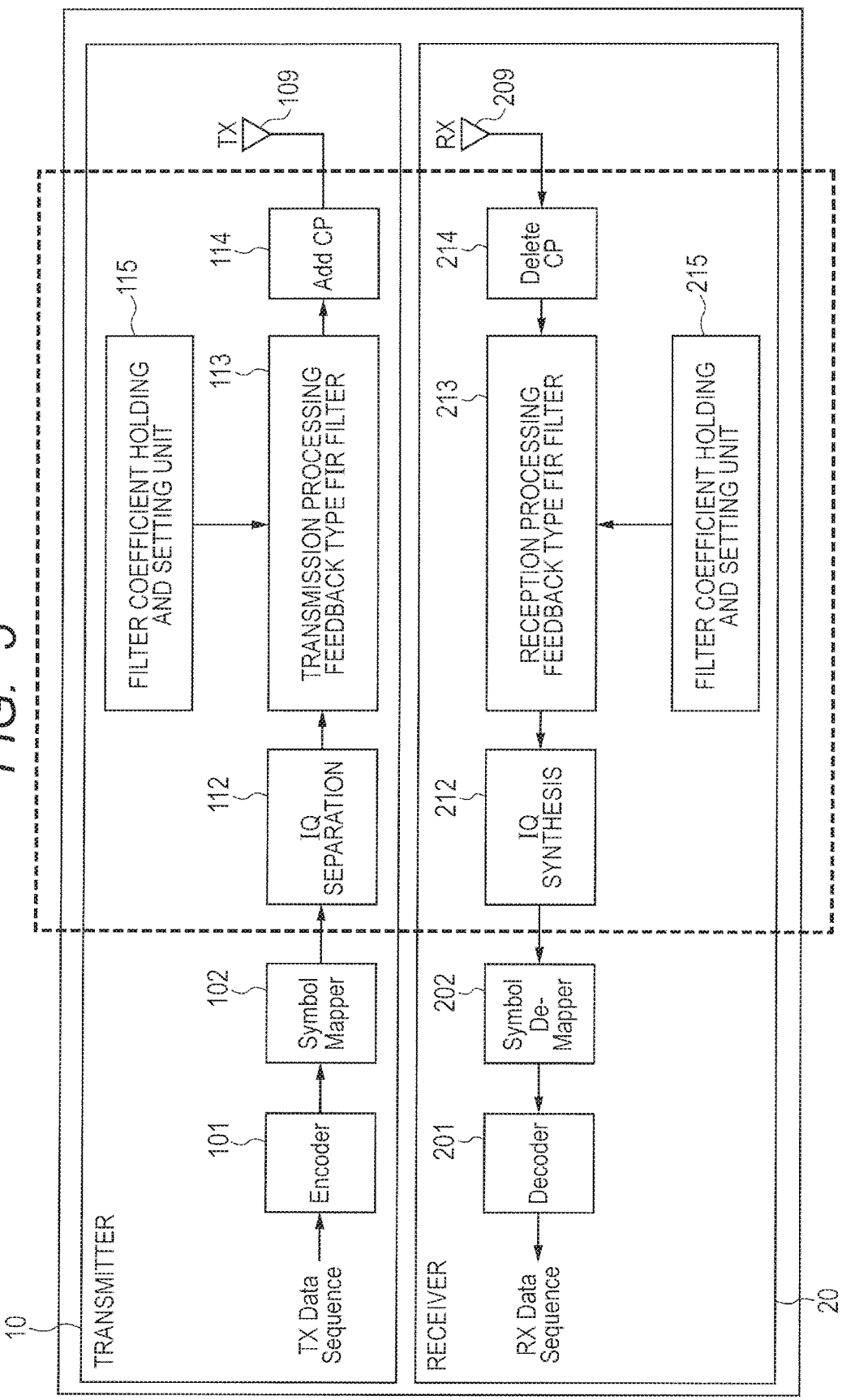
FIG. 5 is a block diagram showing an example of a transmission/reception configuration of a communication system according to an embodiment 1.

FIG. 5 shows a block diagram of a transmission/reception configuration of a communication system according to an embodiment 1. In FIG. 5, an "FIR filter having a feedback function" is described as a "feedback type FIR filter". Even in the present specification, it will subsequently be described as the "feedback type FIR filter".

Figure 6:
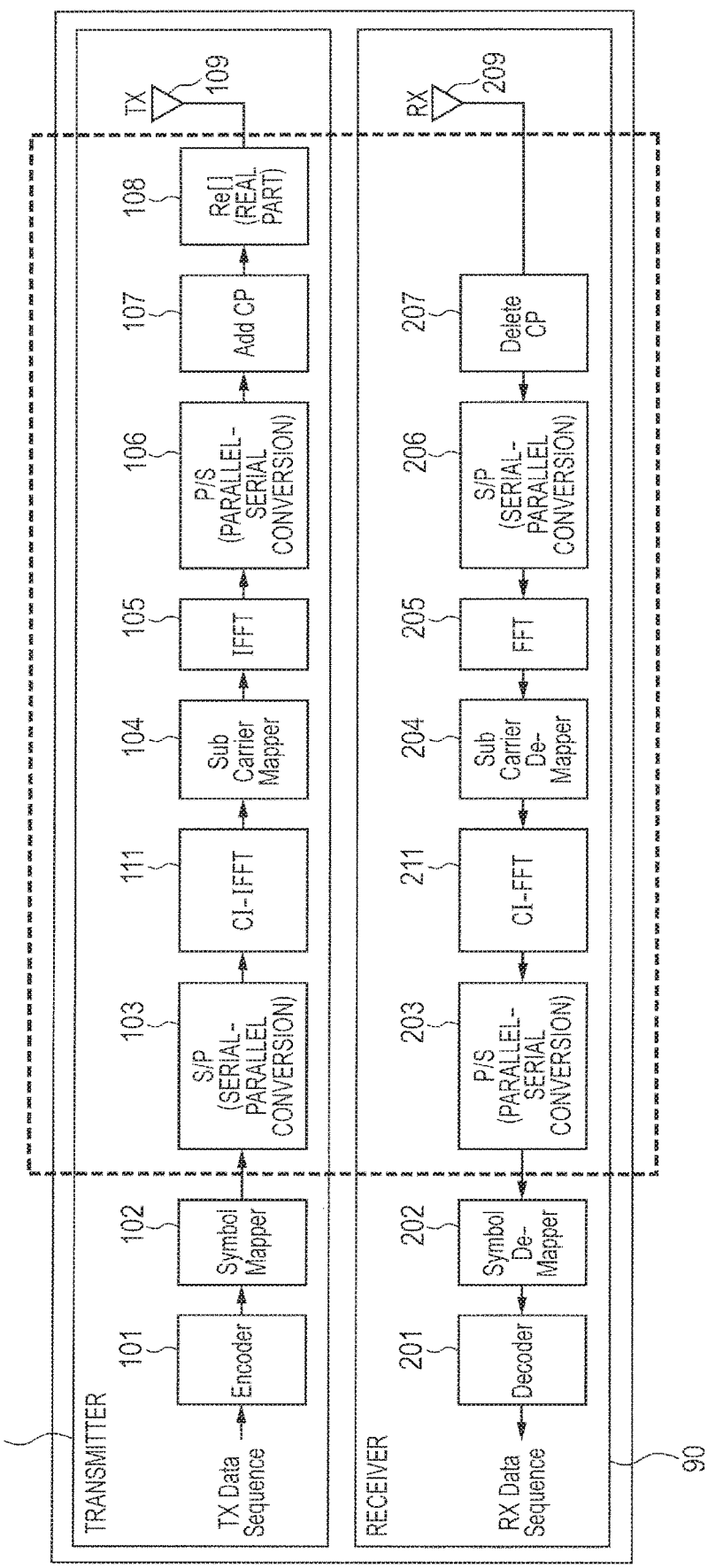
FIG. 6 is a block diagram showing an example of the transmission/reception configuration of the CI-OFDM system according to the related art 2.

Further, for comparison, a block diagram of the transmission/reception configuration of the CI-OFDM system according to the related art 2 is also shown in FIG. 6.

In FIGS. 5 and 6, elements surrounded by dotted lines become elements which perform processing equivalent to each other.

As shown in FIG. 5, in the communication system according to the embodiment 1, an IQ separation unit 112, a transmission processing feedback type FIR filter 113, an add CP unit 114, and a filter coefficient holding and setting unit 115 are provided between a symbol mapper 102 and a TX unit 109 on the transmitter 10 side. Further, on the receiver 20 side, a delete CP unit 214, a reception processing feedback type FIR filter 213, an IQ synthesis unit 212, and a filter coefficient holding and setting unit 215 are provided between an RX unit 209 and a symbol de-mapper 202.

The respective elements of the communication system according to the embodiment 1 shown in FIG. 5 will be described below.

<Configuration of Transmitter>

A TX data sequence inputted to an encoder 101 is a data sequence generated by a computer, a cellular phone, electronic equipment, a memory, or the like.

The encoder 101 executes encoding processing such as a scramble, an FEC (Forward Error Correction), interleave, etc. on the TX data sequence.

The symbol mapper 102 executes digital modulation such as PSK (Phase Shift Keying), QAM (Quadrature Amplitude Modulation) or the like on the TX data sequence outputted from the encoder 101. The PSK is BPSK (Binary PSK), QPSK (Quadrature PSK) or the like. The QAM is 16QAM, 64QAM or the like.

The IQ separation unit 112 separates the TX data sequence outputted from the symbol mapper 102 into I and Q components.

The filter coefficient holding and setting unit 115 holds the generated filter coefficient and sets it to the transmission processing feedback type FIR filter 113. Incidentally, a method for generating the filter coefficient will be described in FIG. 10 to be described later.

The transmission processing feedback type FIR filter 113 is comprised of feedback type FIR filters respectively corresponding to the I and Q components of the TX data sequence after the digital modulation and performs filter processing on the I and Q components of the post-digital modulation TX data sequence. Incidentally, the detailed configuration of the transmission processing feedback type FIR filter 113 will be described in FIG. 7A to be described later.

The add CP unit 114 adds a CP to the head of the TX data sequence outputted from the transmission processing feedback type FIR filter 113. Specifically, the add CP unit 114 performs processing of adding an m sample to the head of the TX data sequence from the end of the TX data sequence. This processing is general processing in the OFDM system (refer to FIG. 7A to be described later).

The TX unit 109 executes processing such as D/A (Digital/Analog) conversion, LPF (Low Pass Filter) processing, power amplification, up-convert, etc. on the TX data sequence outputted from the add CP unit 114 and transmits the processed TX data sequence by radio waves or wire.

<Configuration of Receiver>

The RX unit 209 receives an RX data sequence therein and executes processing such as down-convert, LPF processing, RSSI (Received Signal Strength Indication) multiplication processing, A/D conversion, etc. on the RX data sequence.

The delete CP unit 214 deletes the CP added to the head of the RX data sequence outputted from the RX unit 209.

The filter coefficient holding and setting unit 215 holds the generated filter coefficient and sets the same to the reception processing feedback type FIR filter 213. Incidentally, a method for generating the filter coefficient will be described in FIG. 10 to be described later.

The reception processing feedback type FIR filter 213 is comprised of feedback type filters respectively corresponding to I and Q components of the received RX data sequence and performs filter processing on the I and Q components of the RX data sequence. Incidentally, the detailed configuration of the reception processing feedback type FIR filter 213 will be described in FIG. 8A to be described later.

The IQ synthesis 212 arranges the I and Q components of the RX data sequence outputted from the reception processing feedback type FIR filter 213 like (I, Q), (I, Q), . . . , (I, Q) in one symbol unit (where the RX data sequence is set to be the same arrangement as that for the TX data sequence after being outputted from the symbol mapper 102 at the time of the transmission).

The symbol de-mapper 202 extracts desired data from the RX data sequence rearranged in the symbol unit, which is outputted from the IQ synthesis unit 212, and executes digital demodulation on the extracted data. Incidentally, a method for extracting the desired data will be described later.

A decoder 201 executes decoding processing such as descramble, error correction decoding, de-interleave, etc. on the RX data sequence outputted from the symbol de-mapper 202.

The RX data sequence outputted from the decoder 201 is used in a host device, a host application, etc. according to the purpose.

<Detailed Configuration of Transmitter>

Figure 7A:
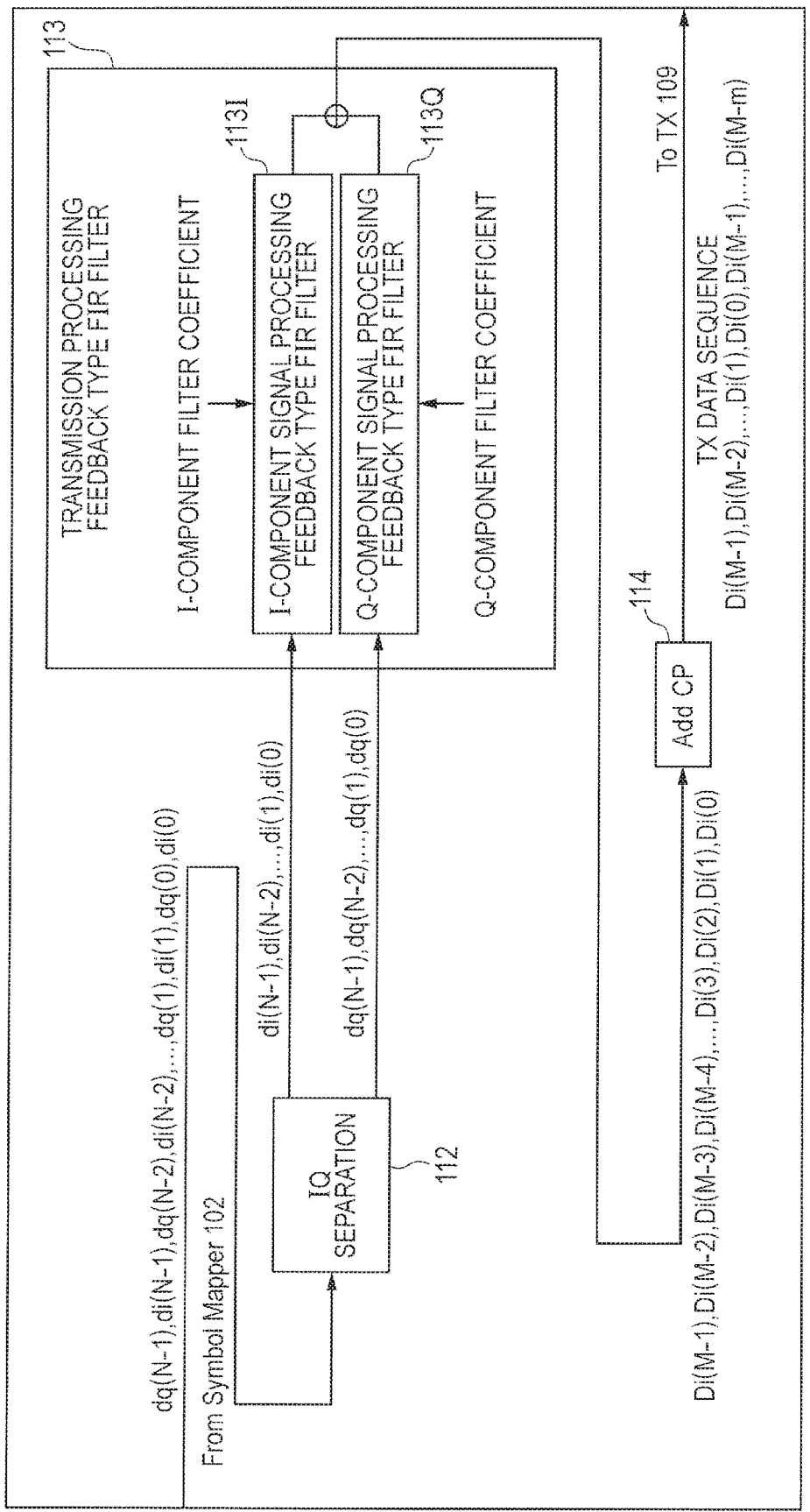
FIG. 7A is a block diagram illustrating an example of detailed configurations and detailed operations of elements surrounded by a dotted line of FIG. 5, of elements of a transmitter in the communication system according to the embodiment 1.

FIG. 7A shows the detailed configuration of the elements surrounded by the dotted line of FIG. 5, of the elements of the transmitter 10 in the communication system according to the embodiment 1.

Figure 7B:
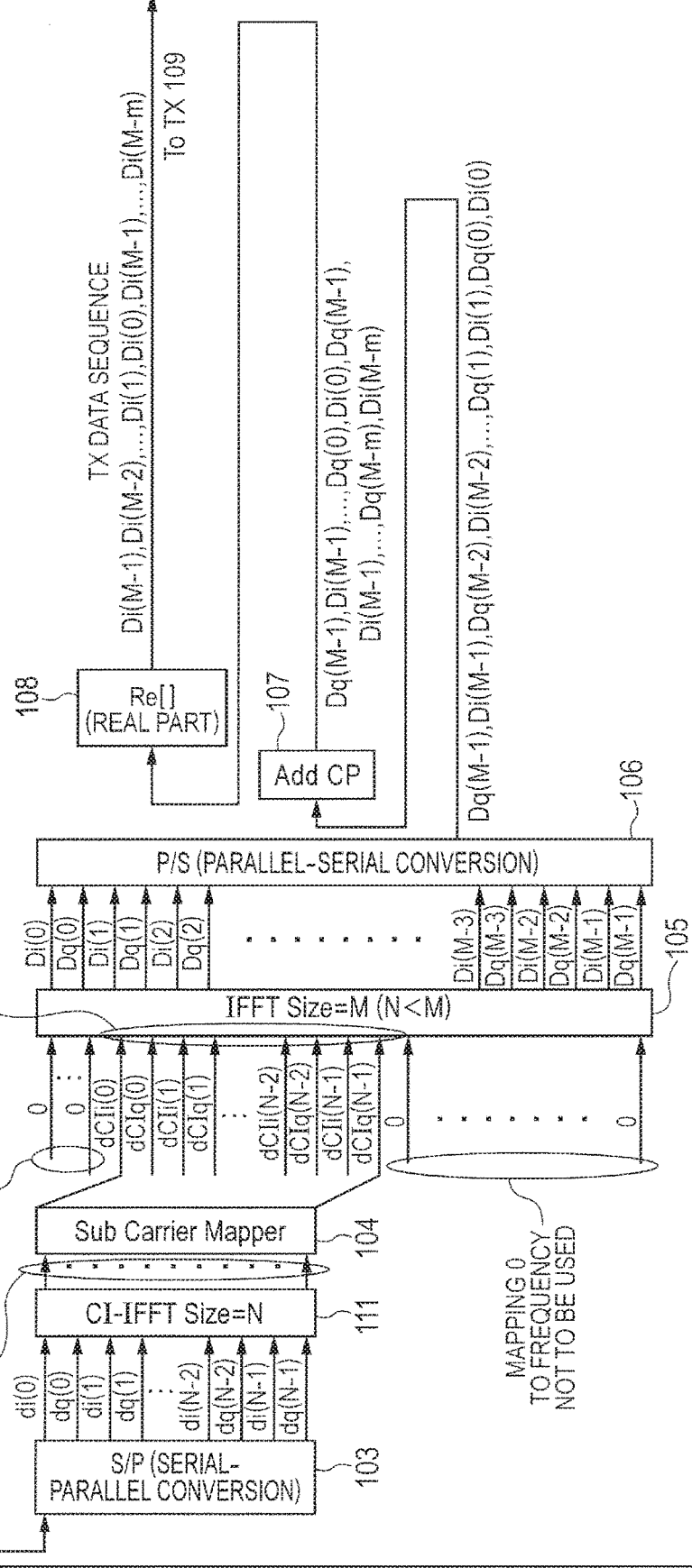
FIG. 7B is a block diagram showing an example of detailed configurations and detailed operations of elements surrounded by a dotted line of FIG. 6, of elements of a transmitter in the CI-OFDM system according to the related art 2.

Further, for comparison, FIG. 7B shows the detailed configuration of the elements surrounded by the dotted line of FIG. 6, of the elements of the transmitter 80 in the CI-OFDM system according to the related art 2.

As shown in FIG. 7A, in the communication system according to the embodiment 1, the transmission processing feedback type FIR filter 113 is comprised of an I-component signal processing feedback type FIR filter 113I and a Q-component signal processing feedback type FIR filter 113Q respectively corresponding to the I and Q components of the TX data sequence.

As shown in FIG. 7B, in the CI-OFDM system according to the related art 2, the CI-IFFT size of the CI-IFFT unit 111 becomes N (where N is a positive integer of 2 or more), and the IFFT size of the IFFT unit 105 becomes M (N<M and M is a positive integer of 2 or more).

Incidentally, the detailed description of FIG. 7A and FIG. 7B will be made later.

<Detailed Configuration of Receiver>

Figure 8A:
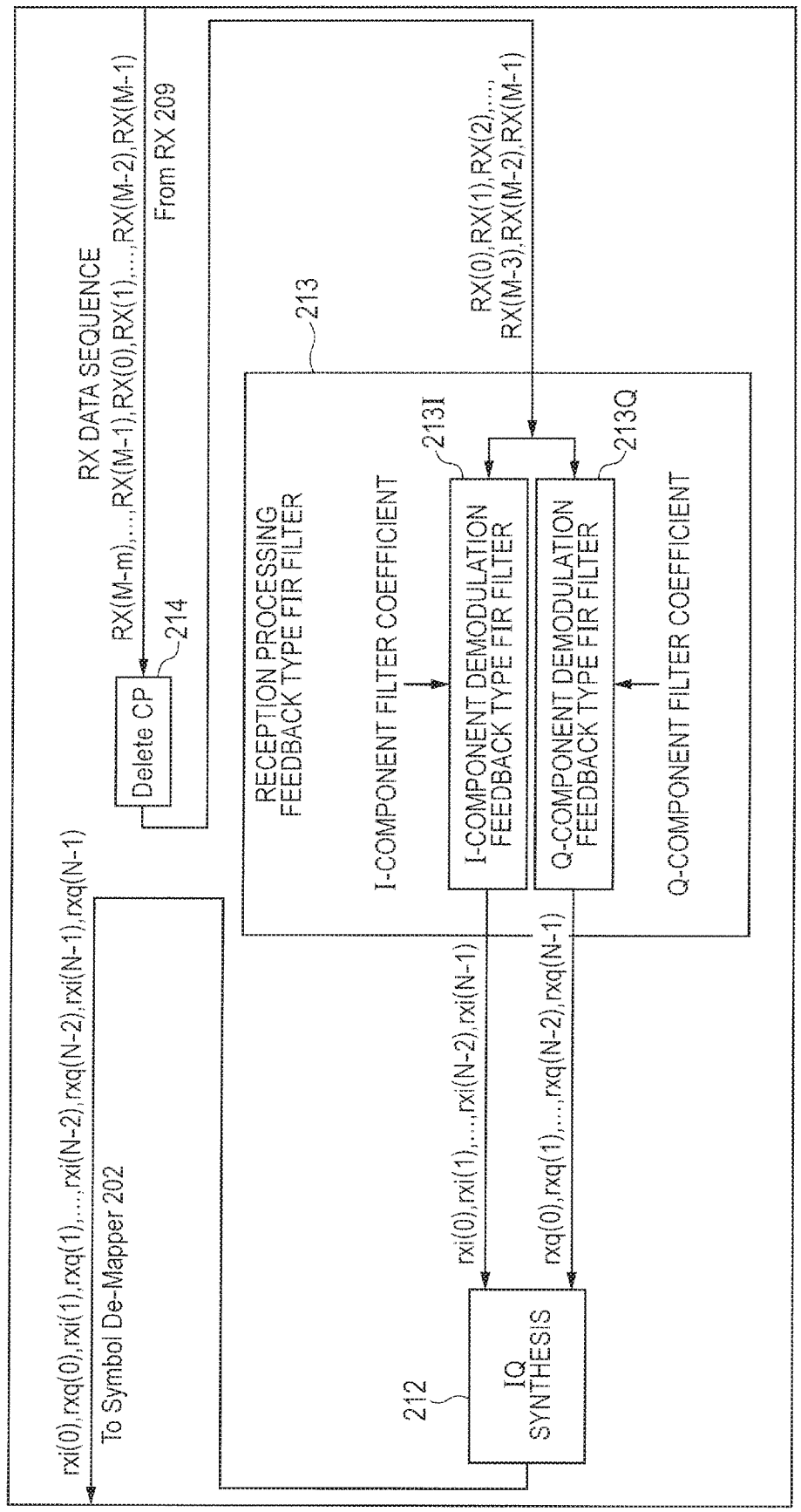
FIG. 8A is a block diagram showing an example of detailed configurations and detailed operations of elements surrounded by a dotted line of FIG. 5, of elements of a receiver in the communication system according to the embodiment 1.

FIG. 8A shows the detailed configuration of the elements surrounded by the dotted line of FIG. 5, of the elements of the receiver 20 in the communication system according to the embodiment 1.

Figure 8B:
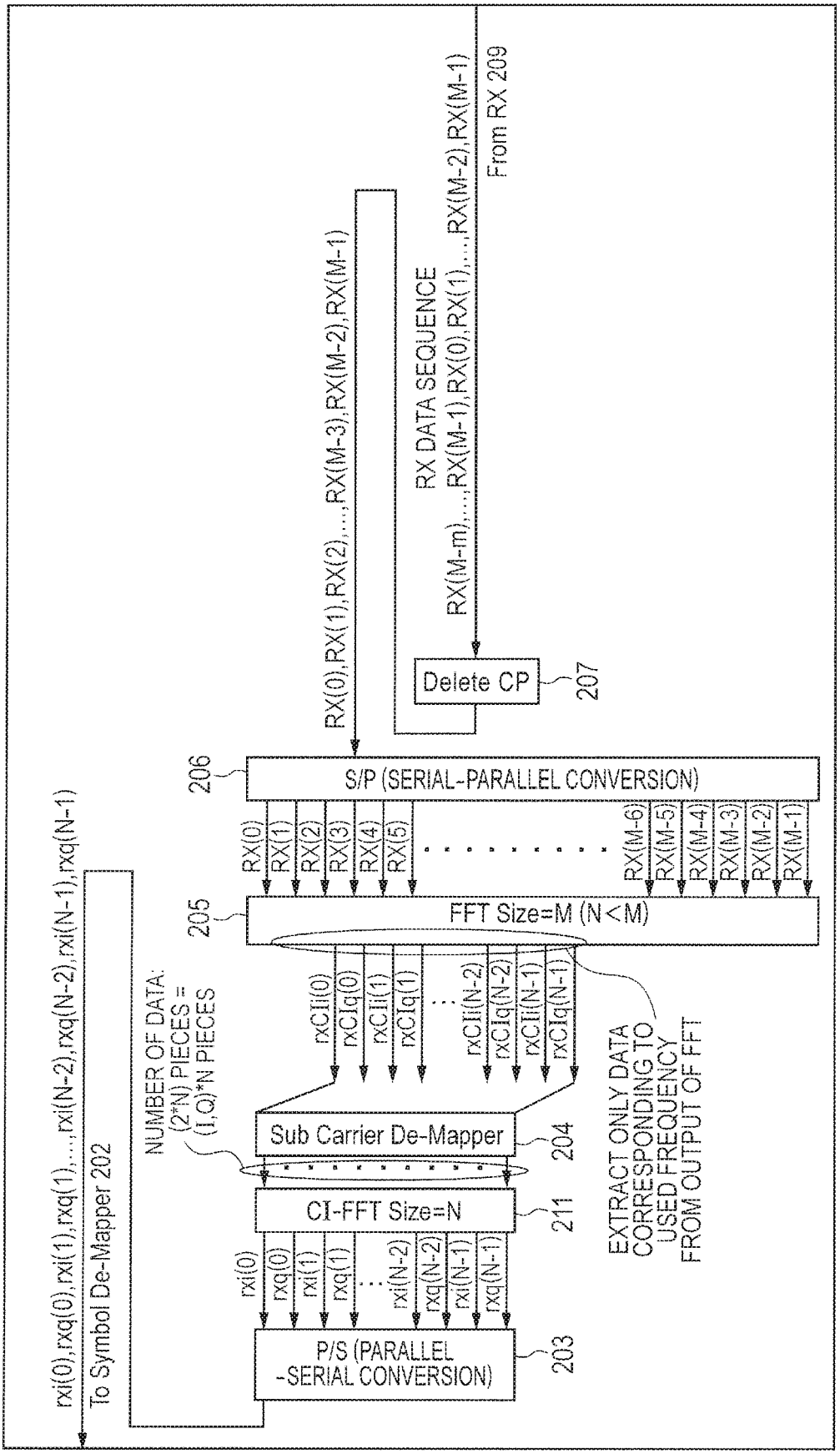
FIG. 8B is a block diagram showing an example of detailed configurations and detailed operations of elements surrounded by the dotted line of FIG. 6, of elements of a receiver in the CI-OFDM system according to the related art 2.

Further, for comparison, FIG. 8B shows the detailed configuration of the elements surrounded by the dotted line of FIG. 6, of the elements of the receiver 90 in the CI-OFDM system according to the related art 2.

As shown in FIG. 8A, in the communication system according to the embodiment 1, the reception processing feedback type FIR filter 213 is comprised of an I-component demodulation feedback type FIR filter 213I and a Q-component demodulation feedback type FIR filter 213Q respectively corresponding to the I and Q components of the RX data sequence.

As shown in FIG. 8B, in the CI-OFDM system according to the related art 2, the CI-FFT size of the CI-FFT unit 211 becomes N, and the FFT size of the FFT unit 205 becomes M (N<M).

Incidentally, the detailed description of FIGS. 8A and 8B will be descried later.

<Configuration of Feedback Type FIR Filter>

Figure 9A:
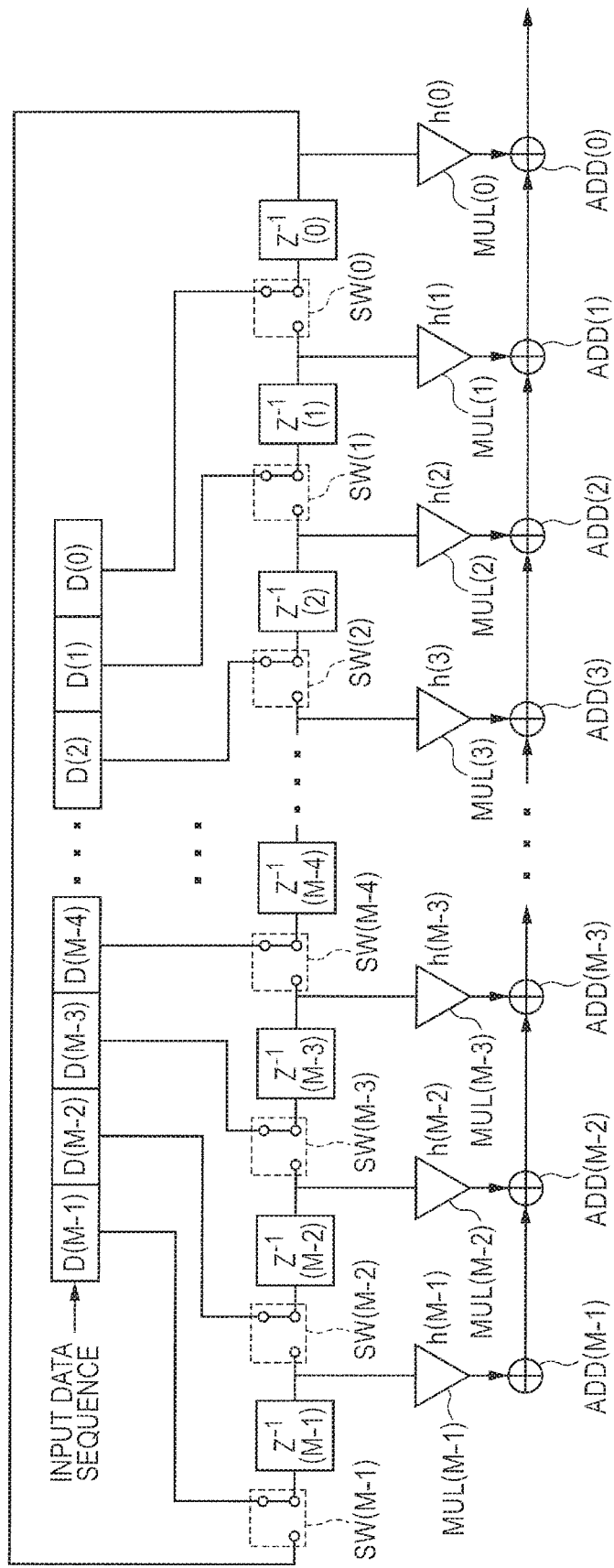
FIG. 9A is a diagram showing an example of a configuration of a feedback type FIR filter in the embodiment 1.
Figure 9B:
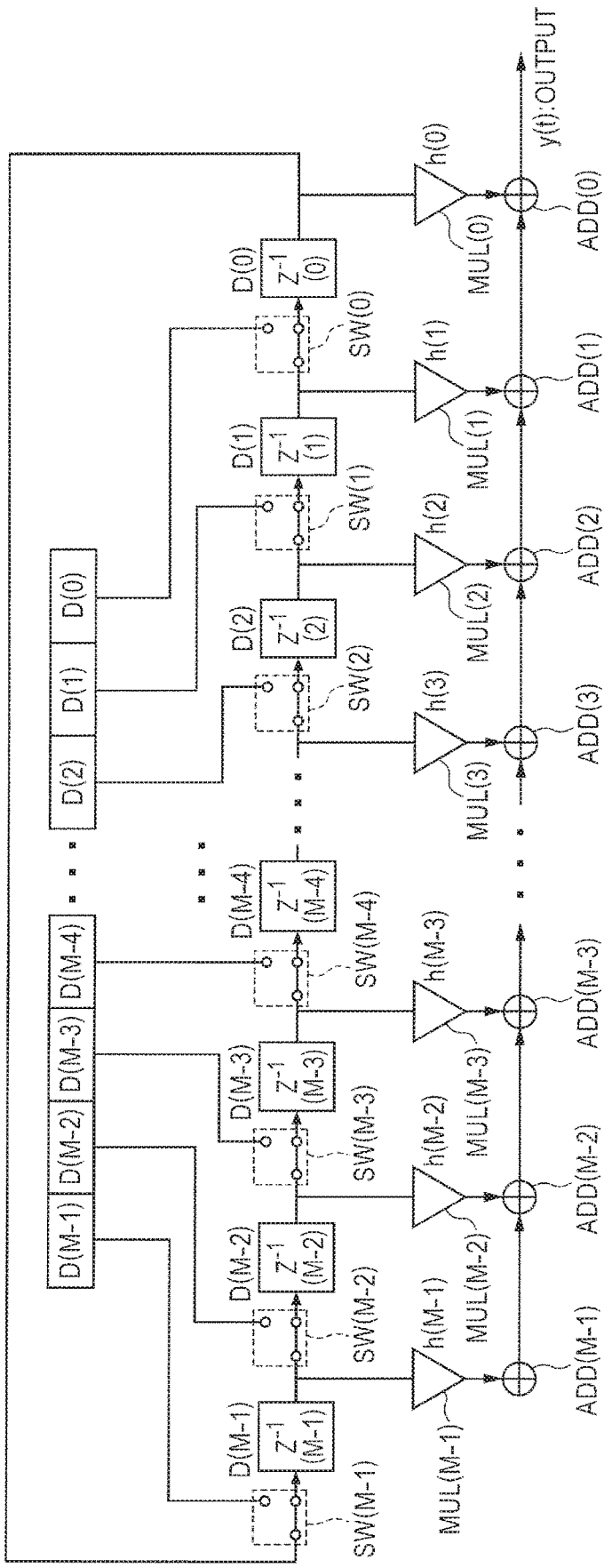
FIG. 9B is a diagram showing the example of the configuration of the feedback type FIR filter in the embodiment 1.

FIGS. 9A and 9B respectively show configuration diagrams of the I-component signal processing feedback type FIR filter 113I and the Q-component signal processing feedback type FIR filter 113Q both shown in FIG. 7A, and the I-component demodulation feedback type FIR filter 213I and the Q-component demodulation feedback type FIR filter 213Q both shown in FIG. 8A. The FIR filters shown in FIGS. 9A and 9B will be described as feedback type FIR filters. Incidentally, FIG. 9A shows processing when the processing of inputting data to each delay element is performed. FIG. 9B shows processing when shift processing is performed after the input of the data to each delay element. Although the four feedback type FIR filters in FIGS. 7A and 8A are all the same in configuration, a filter coefficient for the I component and a filter coefficient for the Q component are different from each other.

As shown in each of FIGS. 9A and 9B, the feedback type FIR filter is equipped with M delay elements $Z^{-1}$ (m), M multipliers (taps) MUL (m), M adders ADD (m), and M switches SW (m). M is the same value as the IFFT/FFT size number in the CI-OFDM system according to the related art 2, which is shown in each of FIGS. 7B and 8B. Further, m=0, 1, . . . , M−2, and M−1.

The M delay elements $Z^{-1}$ (m) are connected in cascade, and the output of the last stage delay element $Z^{-1}$ (0) and the input of the first stage delay element $Z^{-1}$ (M−1) are connected to each other. Data inputted to each delay element $Z^{-1}$ (m) other than the last stage delay element $Z^{-1}$ (0) is held for a constant time and thereafter outputted to the next stage delay element $Z^{-1}$ (m). Data inputted to the last stage delay element $Z^{-1}$ (0) is fed back to the first stage delay element $Z^{-1}$ (M−1) after being held for a constant time.

The M multipliers MUL (m) are respectively provided corresponding to the M delay elements $Z^{-1}$ (m) and arranged in the subsequent stages of their corresponding delay elements $Z^{-1}$ (m). Each multiplier MUL (m) has a filter coefficient h (m) set by the filter coefficient holding and setting unit 115 or 215. Each of the multipliers MUL (m) multiplies data and a filter coefficient h (m) outputted from its corresponding delay element $Z^{-1}$ (m).

The M adders ADD (m) are respectively provided corresponding to the M multipliers MUL (m) and arranged in the subsequent stages of their corresponding multipliers MUL (m). Each of the adders ADD (m) adds data outputted from its corresponding multiplier MUL (m) and data outputted from the multiplier MUL (m) in the preceding stage of its corresponding multiplier MUL (m). Data outputted from the last stage adder ADD (0) becomes data y (t) outputted from an output terminal of the feedback type FIR filter. t=0, 1, . . . , M−2, and M−1.

Examples of y (t) are shown below:

$$y(0) = h(0) \times D(0) + h(1) \times D(1) + h(2) \times D(2) +$$
$$\ldots + h(M-2) \times D(M-2) + h(M-1) \times D(M-1)$$
$$y(1) = h(0) \times D(1) + h(1) \times D(2) + h(2) \times D(3) + \ldots +$$
$$h(M-2) \times D(M-1) + h(M-1) \times D(0)$$
$$\vdots$$
$$y(M-1) = h(0) \times D(M-1) + h(1) \times D(0) + h(2) \times D(1) +$$
$$\ldots + h(M-2) \times D(M-3) + h(M-1) \times D(M-2)$$

The M switches SW (m) are switches for connecting the M delay elements $Z^{-1}$ (m) in cascade and switching between a connection state of connecting the output of the last stage delay element $Z^{-1}$ (0) and the input of the first stage delay element $Z^{-1}$ (M−1) and a cutoff state of cutting off the connection between the M delay elements $M^{-1}$ (m). Specifically, the M switches SW (m) are respectively provided corresponding to the M delay elements $Z^{-1}$ (m) and arranged in the preceding stages of their corresponding delay elements $Z^{-1}$ (m). When the cutoff state is taken, each switch SW (m) connects its corresponding delay element $Z^{-1}$ (m) to the input terminal of the feedback type FIR filter. When the connection state is taken, each switch SW (m) connects its corresponding delay element $Z^{-1}$ (m) to the preceding stage delay element $Z^{-1}$ (m+1). Incidentally, when the connection state is taken, the first stage switch SW (M−1) connects the first stage delay element $Z^{-1}$ (M−1) to the last stage delay element $Z^{-1}$ (0).

Further, the filter coefficient of the feedback type FIR filter in the embodiment 1 is generated from a filter characteristic in a time domain, which is obtained by subjecting a rectangular window in a frequency domain to inverse fast Fourier transformation (IFFT) as shown in FIG. 10.

Thus, the TX data sequence outputted from the add CP unit 114 of the transmitter 10 in the first communication system according to the embodiment 1 shown in FIG. 7A can be set to a sequence completely coincident with the TX data sequence outputted from the real part extraction part 108 of the transmitter 80 in the related art 2 shown in FIG. 7B. Further, the RX data sequence outputted from the IQ synthesis unit 212 of the receiver 20 in the communication system according to the embodiment 1 shown in FIG. 8A can be set to a sequence completely coincident with the RX data sequence outputted from the P/S unit 203 of the receiver 90 in the related art 2 shown in FIG. 8B. The details thereof will be described later.

<Operation of Embodiment 1>
<Operation of Transmitter>

A description will next be made about the operations of the elements shown in FIG. 7A, of the elements of the transmitter 10 in the communication system according to the embodiment 1.

Further, for comparison, the operations of the elements shown in FIG. 7B, of the elements of the transmitter 80 in the CI-OFDM system according to the related art 2 will be described together.

The CI-OFDM system according to the related art 2 will first be described with reference to FIG. 7B.

As shown in FIG. 7B, a digital-modulated TX data sequence dq (N−1), di (N−1), dq (N−2), di (N−2), . . . , dq (1), di (1), dq (0), and di (0) outputted from the symbol mapper 102 is inputted to the S/P unit 103. This TX data sequence is serial-parallel converted by the S/P unit 103, followed by execution of CI-IFFT by the CI-IFFT unit 111. Since the CI-IFFT size of the CI-IFFT unit 111 is N, the number of data outputted from the CI-IFFT unit 111 becomes 2×N pieces=(I, Q)×N pieces. Subsequently, the data outputted from the CI-IFFT unit 111 is mapped to sub carriers by the sub carrier mapper 104. At this time, the sub carrier mapper 104 maps the data outputted from the CI-IFFT unit 111 to a frequency to be used and maps "0" to a frequency not to be used. Subsequently, the TX data sequence mapped to the sub carriers by the sub carrier mapper 104 is subjected to IFFT at the IFFT unit 105 and parallel-serial converted by the P/S unit 106. Dq (M−1), Di (M−1), Dq (M−2), Di (M−2), . . . , Dq (1), Di (1), Dq (0), and Di (0) outputted from the P/S unit 106 is given CP at the head of the TX data sequence by the add CP unit 107, from which a real part is extracted by the real part extraction unit 108. The TX data sequence outputted from the real part extraction unit 108 is inputted to the TX unit 109. Processing after the TX unit 109 is similar to the above-described processing. As a result, the TX data sequence outputted from the real part extraction unit 108 becomes Di (M−1), Di (M−2), . . . , Di (1), Di (0), Di (M−1), . . . , and Di (M−m).

Subsequently, the communication system according to the embodiment 1 will be described with reference to FIG. 7A.

As shown in FIG. 7A, a digital-modulated TX data sequence dq (N−1), di (N−1), dq (N−2), di (N−2), . . . , dq (1), di (1), dq (0), and di (0) outputted from the symbol mapper 102 is inputted to the IQ separation unit 112. This TX data sequence is separated into I and Q component by the IQ separation unit 112. The I component inputted to the I-component signal processing feedback type FIR filter 113I, and the Q component is inputted to the Q-component signal processing feedback type FIR filter 113Q. The I and Q components after having passed the I-component signal processing feedback type FIR filter 113I and the Q-component signal processing feedback type FIR filter 113Q are added and outputted. The TX data sequence Di (M−1), Di (M−2), Di (M−3), Di (M−4), . . . , Di (3), Di (2), Di (1), and Di (0) outputted from the transmission processing feedback type FIR filter 113 is given CP at the head thereof by the add CP unit 114. The TX data sequence outputted from the add CP unit 114 is inputted to the TX unit 109. Processing after the TX unit 109 is similar to the above-described processing. As a result, the TX data sequence outputted from the add CP unit 114 becomes Di (M−1), Di (M−2), . . . , Di (1), Di (0), Di (M−1), . . . , and Di (M−m). The TX data sequence becomes the same sequence as the TX data sequence outputted from the real part extraction unit 108 in FIG. 7B. This can be confirmed from FIGS. 11 and 12 to be described later.

<Operation of Receiver>

A description will next be made about the operations of the elements shown in FIG. 8A, of the elements of the receiver 20 in the communication system according to the embodiment 1.

Further, for comparison, the operations of the elements shown in FIG. 8B, of the elements of the receiver 90 in the CI-OFDM system according to the related art 2 will be described together.

The CI-OFDM system according to the related art 2 will first be described with reference to FIG. 8B.

As shown in FIG. 8B, an RX data sequence RX (M−m), . . . , RX (M−1), RX (0), RX (1), . . . , RX (M−2), and RX (M−1) outputted from the RX unit 209 is inputted to the delete CP unit 207. The delete CP unit 207 deletes CP added to the head of the RX data sequence from the RX data sequence. The so-processed RX data sequence is serial-parallel converted by the S/P unit 206, followed by execution of FFT by the FFT unit 205. Only data of a frequency to be used in the RX data sequence subjected to FFT at the FFT unit 205 is de-mapped from the sub carriers by the sub carrier de-mapper 204. Since the CI-FFT size of the CI-FFT unit 211 is N, the number of data outputted from the sub carrier de-mapper 204 becomes 2×N pieces=(I, Q)×N pieces. Further, the RX data sequence is parallel-serial converted by the P/S unit 203 and inputted to the symbol de-mapper 202. Processing after the symbol de-mapper 202 is similar to the above-described processing. As a result, the RX data sequence outputted from the P/S unit 203 becomes rxi (0), rxq (0), rxi (1), rxq (1), . . . , rxi (N−2), rxq (N−2), rxi (N−1), and rxq (N−1).

Subsequently, the communication system according to the embodiment 1 will be described with reference to FIG. 8A.

As shown in FIG. 8A, an RX data sequence RX (M−m), . . . , RX (M−1), RX (0), RX (1), . . . , RX (M−2), and RX (M−1) outputted from the RX unit 209 is inputted to its corresponding delete CP unit 214. The delete CP unit 214 deletes CP added to the head of the RX data sequence from the RX data sequence. The RX data sequence outputted from the delete CP unit 214 is inputted to the I-component demodulation feedback type FIR filter 213I and the Q-component demodulation feedback type FIR filter 213Q. That is, the RX data sequence inputted to the I-component demodulation feedback type FIR filter 213I and the Q-component demodulation feedback type FIR filter 213Q becomes the same data sequence. The I component after having passed the I-component demodulation feedback type FIR filter 213I, and the Q component after having passed the Q-component demodulation feedback type FIR filter 213Q are synthesized to assume an arrangement of (I, Q), (I, Q), . . . , and (I, Q) in one symbol unit (they are set to the same sequence as the data sequence after the output of the symbol mapper 102 at the transmission) at the IQ synthesis unit 212. The RX data sequence rearranged in the symbol unit is inputted to the symbol de-mapper 202. Processing after the symbol de-mapper 202 is similar to the above-described processing. As a result, the RX data sequence outputted from the IQ synthesis unit 212 becomes rxi (0), rxq (0), rxi (1), rxq (1), . . . , rxi (N−2), rxq (N−2), rxi (N−1), and rxq (N−1) and becomes the same sequence as the RX data sequence outputted from the P/S unit 203 in FIG. 8B.

<Operation of Feedback Type FIR Filter>

The operation of the feedback type FIR filter shown in FIGS. 9A and 9B will next be described.

The feedback type FIR filter shown in FIGS. 9A and 9B is configured using the general linear type FIR filter as a base, but different its configuration and operation from the general linear type FIR filter in regard to the following two points.

(A1) Feedback Configuration

The feedback type FIR filter shown in FIGS. 9A and 9B is configured to have a path from the last stage delay element $Z^{-1}$ (0) to the first stage delay element $Z^{-1}$ (M−1).

The data inputted to the last stage delay element $Z^{-1}$ (0) is multiplied with a filter coefficient h (0) after being shifted. Thereafter, the data is inputted to the first stage delay element $Z^{-1}$ (M−1). Therefore, all data continue to be used without disappearing until the processing is completed.

On other hand, the general linear type FIR filter does not have the above path. The data inputted to the last stage delay element $Z^{-1}$ (0) disappears after being shifted and is not used in the subsequent processing process.

(A2) Use Method of Setting Initial Value

The feedback type FIR filter shown in FIGS. 9A and 9B is configured to set data to a prescribed delay element $Z^{-1}$ (m) as its initial value in transmission/reception processing.

On the other hand, the general linear type FIR filter is configured to set "0" to all delay elements $Z^{-1}$ (m) as the initial value, input data to be processed to the first stage delay element $Z^{-1}$ (M−1) one by one, and shift the same.

<Operation of Transmission Processing Feedback Type FIR Filter>

The operation of the transmission processing feedback type FIR filter 113 will be described with reference to FIGS. 9A and 9B.

(B1) First, as shown in FIG. 9A, the M switches SW (m) perform switching to the cutoff state of cutting off the connection between the M delay elements $Z^{-1}$ (m).

Then, N I components in the TX data sequence outputted from the IQ separation unit 112 shown in FIG. 7A are set to prescribed delay elements $Z^{-1}$ (m) of the I-component signal processing feedback type FIR filter 113I as initial values. Further, N Q components in the TX data sequence outputted from the IQ separation unit 112 are set to prescribed delay elements $Z^{-1}$ (m) of the Q-component signal processing feedback type FIR filter 113Q as initial values. "0" is set to the delay elements $Z^{-1}$ (m) other than the above in the I-component signal processing feedback type FIR filter 113I and the Q-component signal processing feedback type FIR filter 113Q. Incidentally, the positions of the prescribed delay elements $Z^{-1}$ (m) can be obtained from the result of the IFFT size of the CI-OFDM system according to the related art 2 shown in FIG. 7B being M and handled as known information.

(B2) Following the above, as shown in FIG. 9B, the M switches SW (m) perform switching to the connection state of connecting the M delay elements $Z^{-1}$ (m) in cascade and connecting the output of the last stage delay element $Z^{-1}$ (0) and the input of the first stage delay element $Z^{-1}$ (M−1).

Further, data set to each delay element $Z^{-1}$ (m) of the I-component signal processing feedback type FIR filter 113I and the Q-component signal processing feedback type FIR filter 113Q as an initial value is subjected to shift processing of outputting to the next stage delay element $Z^{-1}$ (m) by M times corresponding to the IFFT size number of the transmitter 80 in the CI-OFDM system according to the related art 2 shown in FIG. 7B.

(B3) At this time, the data inputted to the delay element $Z^{-1}$ (0) is multiplied with a filter coefficient h (0) after being shifted and inputted (fed back) to the delay element $Z^{-1}$ (M−1).

Here, assuming that the data inputted to the delay element $Z^{-1}$ (m) is di (m), and the filter coefficient is hi (m), the output Di (k) of the I-component signal processing feedback type FIR filter 113I is represented by the following equation. k=0, 1, . . . , M−2, and M−1. Incidentally, x % M indicates a remainder obtained by dividing x by M (the same applies hereinafter).

$$Di(k) = \sum_{m=0}^{M-1} hi(m) \times di((m+k)\% M),$$

$$(k = 0, 1, \ldots, M-2, M-1)$$

Further, assuming that the data inputted to the delay element $Z^{-1}$ (m) is dq (m), and the filter coefficient is hq (m), the output Dq (k) of the Q-component signal processing feedback type FIR filter 113Q is represented by the following equation:

$$Dq(k) = \sum_{m=0}^{M-1} hq(m) \times dq((m+k)\% M),$$

$$(k = 0, 1, \ldots, M-2, M-1)$$

(B4) The output Di (k) of the I-component signal processing feedback type FIR filter 113I and the output Dq (k) of the Q-component signal processing feedback type FIR filter 113Q are added for each shift. The transmission processing feedback type FIR filter 113 generates a TX data sequence D (k) represented by the following equation after shifting of M times. This D (k) is inputted to the add CP unit 114.

$$D(k) = Di(k) + Dq(k) =$$

$$\sum_{m=0}^{M-1} hi(m) \times di((m+k)\% M) + \sum_{m=0}^{M-1} hq(m) \times dp((m+k)\% M),$$

$$(k = 0, 1, \ldots, M-2, M-1)$$

Incidentally, in the processing processes of the above (B3) and (B4), it is not necessary to execute multiplication and addition processing where the data di (m) and dq (m) are "0".

<Operation of Reception Processing Feedback Type FIR Filter>

The operation of the reception processing feedback type FIR filter 213 will be described with reference to FIGS. 9A and 9B.

(C1) First, as shown in FIG. 9A, the M switches SW (m) perform switching to the cutoff state of cutting off the connection between the M delay elements $M^{-1}$ (m).

Then, RX data sequences brought into M data sequences with CP being deleted by the delete CP unit 214 shown in FIG. 8A are set as initial values from the delay element $Z^{-1}$ (0) in each of the I-component demodulation feedback type FIR filter 213I and the Q-component demodulation feedback type FIR filter 213Q to the delay element $Z^{-1}$ (M−1) therein in order. That is, the same RX data sequence is set to the I-component demodulation feedback type FIR filter 213I and the Q-component demodulation feedback type FIR filter 213Q.

(C2) Following the above, as shown in FIG. 9B, the M switches SW (m) perform switching to the connection state of connecting the M delay elements $Z^{-1}$ (m) in cascade and connecting the output of the last stage delay element $Z^{-1}$ (0) and the input of the first stage delay element $Z^{-1}$ (M−1).

Further, data set to each delay element $Z^{-1}$ (m) of the I-component demodulation feedback type FIR filter 213I and the Q-component demodulation feedback type FIR filter 213Q is subjected to shift processing of outputting to the next stage delay element $Z^{-1}$ (m) by M times corresponding to the FFT size number of the receiver 90 in the CI-OFDM system according to the related art 2 shown in FIG. 8B.

(C3) At this time, the data inputted to the delay element $Z^{-1}$ (0) is multiplied with a filter coefficient h (0) after being shifted and inputted (fed back) to the delay element $Z^{-1}$ (M−1).

Here, assuming that the data inputted to the delay element $Z^{-1}$ (m) is RXi (m), and the filter coefficient is hi (m), the output rxi (k) of the I-component demodulation feedback type FIR filter 213I is represented by the following equation. k=0, 1, . . . , M−2, and M−1.

$$rxi(k) = \sum_{m=0}^{M-1} hi(m) \times RXi((m+k)\% M),$$

$$(k = 0, 1, \ldots, M-2, M-1)$$

Further, assuming that the data inputted to the delay element $Z^{-1}$ (m) is RXq (m), and the filter coefficient is hq (m), the output rxq (k) of the Q-component demodulation feedback type FIR filter 213Q is represented by the following equation:

$$rxq(k) = \sum_{m=0}^{M-1} hq(m) \times RXq((m+k)\% M),$$

$$(k = 0, 1, \ldots, M-2, M-1)$$

(C4) The output of the I-component demodulation feedback type FIR filter 213I and the output of the Q-component demodulation feedback type FIR filter 213Q for each shift can be represented by the above equations, and they are inputted to the IQ synthesis unit 212.

<Desired Data Extraction Method in Symbol De-Mapper>

As described above, the transmission processing feedback type FIR filter 113 sets the N I components and N Q components of the TX data sequence outputted from the IQ separation unit 112 to the prescribed delay elements $Z^{-1}$ (m) in the I-component signal processing feedback type FIR filter 113I and the Q-component signal processing feedback type FIR filter 113Q as the initial values respectively and sets "0" to the delay elements $Z^{-1}$ (m) other than the above.

Assume now that of the M delay elements $Z^{-1}$ (m), N delay elements to each of which the data outputted from the IQ separation unit 112 is set as the initial value are defined as delay elements $Z^{-1}$ (n) (where n=0, 8, 16, . . . , (M−16), (M−8)). In this case, the symbol de-mapper 202 extracts the following demodulation data of I and Q components as objects to be digital-demodulated:

I-component demodulation data: rxi (0), rxi (8), rxi (16), . . . , rxi (M−16), and rxi (M−8), and Q-component demodulation data: rxq (0), rxq (8), rxq (16), . . . , rxq (M−16), and rxq (M−8).

That is, the symbol de-mapper 202 extracts data corresponding to the position of the delay element $Z^{-1}$ (n) to which the data outputted from the IQ separation unit 112 is set as the initial value in the transmitter 10.

From this point of view, the I-component demodulation feedback type FIR filter 213I and the Q-component demodulation feedback type FIR filter 213Q in the receiver 20 may perform multiplication and addition processing only on the case of k=0, 8, 16, . . . , (M−16), and (M−8) in the equations described in the above term <Operation of reception processing feedback type FIR filter> and may perform only data shift processing for each delay element in cases other than it.

<Method of Generating Filter Coefficient of Feedback Type FIR Filter>

FIG. 10 shows a method for generating each filter coefficient of the feedback type FIR filter in the embodiment 1 shown in FIGS. 9A and 9B.

As shown in FIG. 10, an IFFT/FFT size of the communication system is assumed to be an M point (frequency: domain of m to m+M−1, and M is similar to the IFFT/FFT size in the CI-OFDM system according to the related art 2 shown in FIGS. 7B and 8B) in a frequency domain. Further, the number of frequencies mapping data is assumed to be an N point (frequency: domain of n to n+N−1, and N is similar to the CI-IFFT/CI-FFT size N in the CI-OFDM system according to the related art 2 shown in FIGS. 7B and 8B) within the M point. In this case, the inverse Fourier transform of size M is performed on a rectangular window (frequency at the upper stage of FIG. 10: domain of m to m+M−1) in which a domain corresponding to the N point is assumed to be "1", and domains other than the domain are assumed to be "0", to obtain filter characteristics (lower stage of FIG. 10) in respective time domains of the I and Q components.

The filter characteristics in the time domains, which are obtained relative to the I and Q components respectively, have M point numbers. They correspond to filter coefficients h (0) to h (M−1) of the M multipliers MUL (0) to MUL (M−1) in the feedback type FIR filter shown in FIGS. 9A and 9B.

<Transmission Waveform of Communication System>

FIG. 11 shows a result of comparison between a transmission waveform of the communication system according to the embodiment 1, and a transmission waveform of the CI-OFDM system according to the related art 2 at BPSK modulation. Also, FIG. 12 shows a result of comparison between a transmission waveform of the communication system according to the embodiment 1, and a transmission waveform of the CI-OFDM system according to the related art 2 at 256QAM modulation. Incidentally, in FIGS. 11 and 12, N=32, and M=256 (where N and M are values described in FIGS. 7B and 8B).

As shown in FIGS. 11 and 12, it is understood that even when either of BPSK and 256QAM is executed, the transmission waveform of the communication system according to the embodiment 1 is coincident with the transmission waveform of the CI-OFDM system according to the related art 2.

<Effects of Embodiment 1>

The communication system according to the embodiment 1 realizes the processing equivalent to the CI-IFFT/CI-FFT and IFFT/FFT in the CI-OFDM system according to the related art 2 shown in FIG. 6 by means of the feedback type FIR filters as illustrated in FIG. 5. Therefore, a PAPR reduction effect by the CI code is obtained as with the CI-OFDM system according to the related art 2.

As shown in FIGS. 9A and 9B, the feedback type FIR filter is different in configuration from the general linear type FIR filter and configured to feed back the data inputted to the last stage delay element $Z^{-1}$ (0) to the first stage delay element $Z^{-1}$ (M−1) after being subjected to the shift processing.

Further, the feedback type FIR filter is configured to set the post-modulation data or the received data to the prescribed delay element $Z^{-1}$ (m) as the initial value without setting "0" to the first stage delay element $Z^{-1}$ (M−1) unlike the general linear type FIR filter.

The communication system according to the embodiment 1 is capable of obtaining by using the feedback type FIR filters, the TX data sequence and the RX data sequence equivalent to the results of processing of the CI-IFFT/CI-FFT and IFFT/FFT in the CI-OFDM system according to the related art 2 shown in FIG. 6.

Thus, the communication system according to the embodiment 1 is capable of solving the problem at the application of IFFT/FFT because it is possible to obtain the PAPR reduction effect equivalent to that of the CI-OFDM system according to the related art 2 with the simple configuration using the feedback type FIR filters.

That is, a problem arises in that in the IFFT/FFT, the hardware circuit scale and the memory capacity become large because the butterfly operations over the multiple stages are required, and the memory of storing the switching processing and the halfway result therein is required. On the other hand, the simple shift processing and the multiplication and addition are repeated in the feedback type FIR filter shown in FIGS. 9A and 9B.

Thus, the communication system according to the embodiment 1 is capable of reducing the hardware circuit scale and the memory capacity for the IFFT/FFT. This can lead even to a size reduction, a reduction in power consumption, and a cost reduction.

Also, in the communication system according to the embodiment 1, the program size of firmware can also be reduced because it is possible to reduce a program size for realizing the same processing. This can lead even to miniaturization.

Further, in the communication system 1 according to the embodiment 1, the filter coefficient of the feedback type FIR filter is generated from the filter characteristic in the time domain, which is obtained by applying the inverse Fourier transformation on the rectangular wave in the frequency domain. Thus, this contributes to obtaining the TX data sequence and the RX data sequence equivalent to the results of processing of the CI-IFFT/CI-FFT and IFFT/FFT in the CI-OFDM system according to the related art 2 shown in FIG. 6.

Embodiment 2

An embodiment 2 aims to intentionally reduce the number of the multipliers MUL (m) (number of taps) in the feedback type FIR filter in the embodiment 1 shown in FIGS. 9A and 9B on the basis of the configuration and operation of the embodiment 1.

<Configuration of Embodiment 2>
<Configuration of Feedback Type FIR Filter>

Intentionally reducing the number of the multipliers MUL (m) (number of taps) in the feedback type FIR filter shown in FIGS. 9A and 9B corresponds to replacing the value of the filter coefficient h (m) of the multiplier MUL (m) with "0".

By setting the value of the filter coefficient h (m) to "0", the multiplication and addition of the filter coefficient in the multiplier MUL (m) and the data are reduced (calculation can be skipped because of the addition of the results of multiplication of "0" and data). Thus, this can solve the problem at the application of the linear type FIR filter, i.e., the problem that the multiplier number is increased in proportion to the order (number of multipliers) to enlarge the circuit scale and increase the number of times of arithmetic operations and the processing load accompanying it.

Figure 13A:
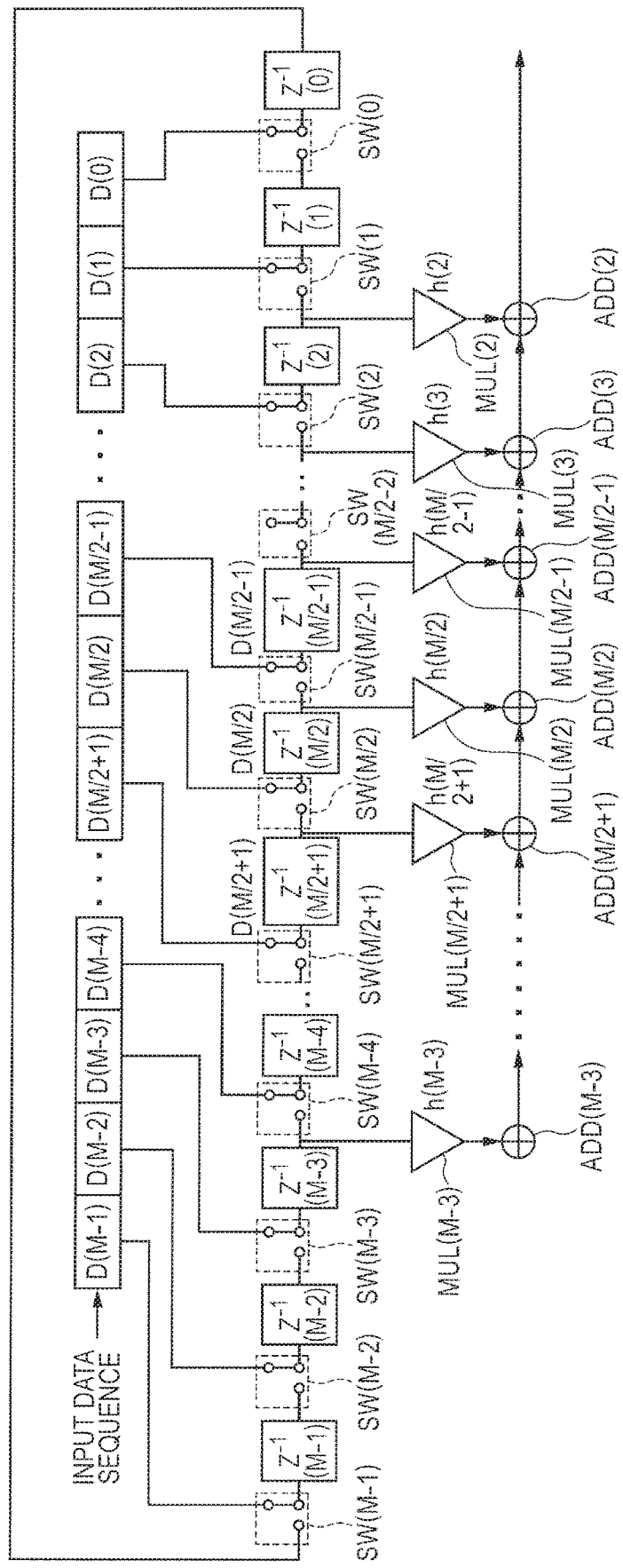
FIG. 13A is a diagram showing an example of a configuration of a feedback type FIR filter in an embodiment 2.
Figure 13B:
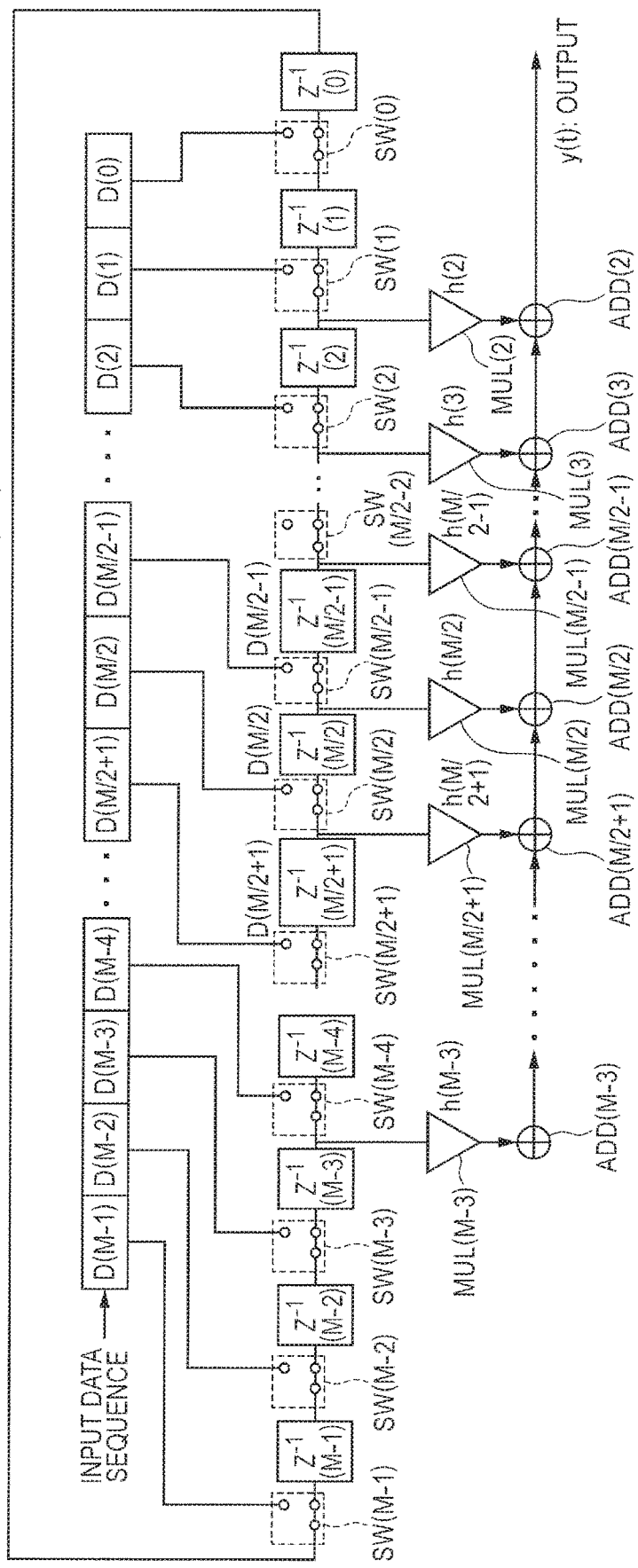
FIG. 13B is a diagram showing the example of the configuration of the feedback type FIR filter in the embodiment 2.

FIGS. 13A and 13B respectively show a configuration diagram of a feedback type FIR filter in the embodiment 2. Incidentally, FIG. 13A shows processing at the time of execution of the processing of inputting data to each delay element, and FIG. 13B shows processing at the time of execution of shift processing after the input of the data to each delay element.

FIGS. 13A and 13B show one example of the configuration of the feedback type FIR filter in the embodiment 2, which is equivalent to one in which in the feedback type FIR filter shown in FIGS. 9A and 9B, the multipliers MUL (0), MUL (1), MUL (M−2), and MUL (M−1) respectively having the filter coefficients h (0), h (1), h (M−2), and h (M−1) are reduced.

The configuration of the embodiment 2 is similar to the configuration shown in each of FIGS. 5, 7A, 8A, 9A, and 9B showing the embodiment 1 except that the number of the multipliers MUL (m) of the feedback type FIR filter is reduced.

<Method for Generating Filter Coefficient of Feedback Type FIR Filter>

Figure 14:
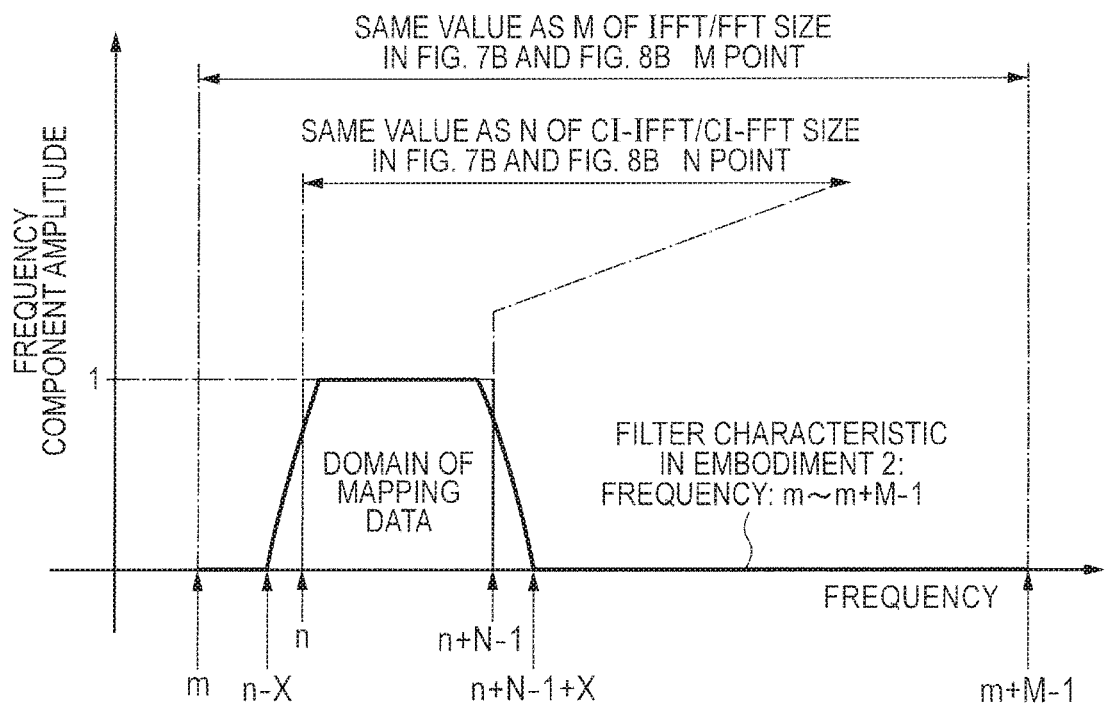
FIG. 14 is a diagram showing an example of a method for generating filter coefficients of the feedback type FIR filter in the embodiment 2.

FIG. 14 shows a method for generating filter coefficients of the feedback type FIR filter in the embodiment 2 shown in FIGS. 13A and 13B.

The embodiment 1 has generated the filter coefficients by using the rectangular window shown in FIG. 10.

On the other hand, in the embodiment 2, the Prinsen-Bradley condition is applied to both ends of the rectangular window shown in FIG. 10 as shown below to define a window shown in FIG. 14. A filter coefficient is generated from a filter characteristic in a time domain, which is obtained by inversely Fourier-transforming this window.

As shown in FIG. 14, in a frequency domain, the IFFT/FFT size of the communication system is assumed to be an M point (frequency: m to m+M−1, and M is similar to the IFFT/FFT size M in the CI-OFDM system according to the related art 2 shown in FIGS. 7B and 8B). Further, the number of frequencies mapping data becomes an N+2X point (frequency: domain of n−X to n+N−1+X, and N is similar to the CI-IFFT/CI-FFT size N in the CI-OFDM system according to the related art 2 shown in FIGS. 7B and 8B) within the M point.

<Prinsen-Bradley Condition>

Figure 15:
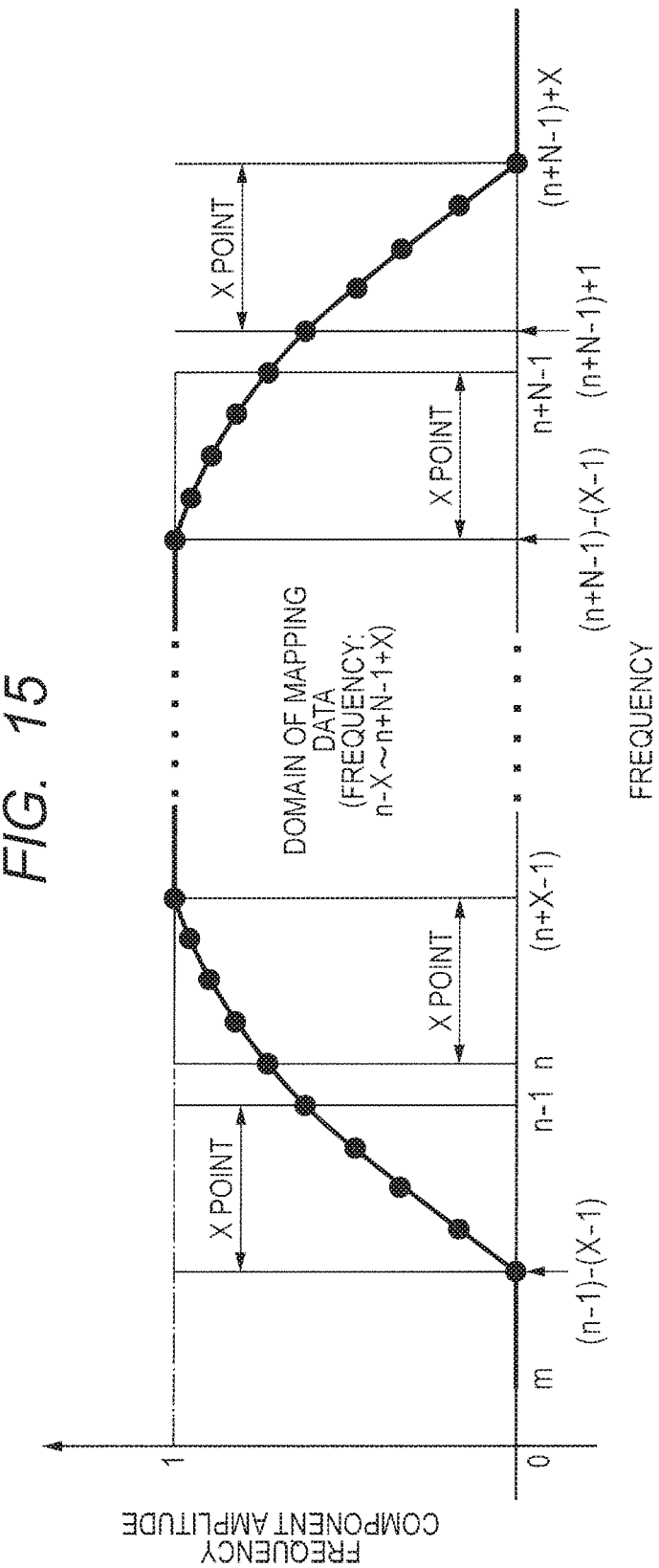
FIG. 15 is an enlarged diagram showing both ends of a window in a frequency domain shown in FIG. 14 in an enlarged form.

FIG. 15 shows an enlarged view of both ends of the window in the frequency domain shown in FIG. 14.

Concerting the Head of Window

Points (black circles) of a frequency characteristic from (n−1)-(X−1) to (n−1), and points (black circles) of a frequency characteristic from n to (n+X−1) are set to satisfy the following conditions.

$$\{(n-1)-(X-1)\}^\wedge 2 + (n+X-1)^\wedge 2 = 1$$
$$\vdots$$
$$(n-1)^\wedge 2 + n^\wedge 2 = 1$$

The above setting is the setting of defining a sum of squares of corresponding points to be "1" centering on points n and n−1 being the ends of the filter characteristic of the rectangular window.

Concerning Termination of Window

Points (black circles) of a frequency characteristic from (n+N−1)-(X−1) to (n+N−1), and points (black circles) of a frequency characteristic from {(n+N−1)+1} to {(n+N−1)+1+(X−1)} are set to satisfy the following conditions.

$$\{(n+N-1)-(X-1)\}^\wedge 2 + \{(n+N-1)+1+(X-1)\}^\wedge 2 = 1$$
$$\vdots$$
$$(n+N-1)^\wedge 2 + \{(n+N-1)+1\}^\wedge 2 = 1$$

The above setting is the setting of defining a sum of squares of corresponding points to be "1" centering on points (n+N−1) and {(n+N−1)+1} being the ends of the filter characteristic of the rectangular window.

<Filter Characteristic of Feedback Type FIR Filter>

FIG. 16A shows a filter characteristic in a time domain of the feedback type FIR filter in the embodiment 2 where N=32 and M=256 (where N and M are values described in FIGS. 7B and 8B).

Further, for comparison, FIG. 16B shows a filter characteristic in a time domain of the feedback type FIR filter in the embodiment 1 where N=32 and M=256.

In the embodiment 1 as shown in FIG. 16B, a filter coefficient assumes valid values other than "0" over the entire domain of 256 points.

On the other hand, as shown in FIG. 16A, in the embodiment 2, it is understood that the number of points at which the filter coefficient assumes valid values other than "0" is about 64 points (±32 points from the center), and the filter coefficient becomes almost "0" at 192 points other than the above points.

In the embodiment 2, the filter characteristic shown in FIG. 16A is used, and the filter coefficient h (m) of the multiplier MUL (m) in the feedback type FIR filter shown in FIGS. 9A and 9B, which corresponds to the position of the multiplier MUL (m) in which the filter coefficient becomes almost "0", is assumed to be "0". Thus, in the embodiment 2, the number of the multipliers MUL (m) in the feedback type FIR filter shown in FIGS. 9A and 9B is intentionally reduced to make the configuration shown in each of FIGS. 13A and 13B.

<Operation of Embodiment 2>

Since the operation of the embodiment 2 is similar to that of the embodiment 1, its description will be omitted.

<Effects of Embodiment 2>

The communication system according to the embodiment 2 generates the filter coefficient of the feedback type FIR filter by applying the window satisfying the Prinsen-Bradley condition in the frequency domain.

Further, the filter coefficient h (m) of the multiplier MUL (m) in the feedback type FIR filter shown in FIGS. 9A and 9B, which corresponds to the position of the multiplier MUL (m) in which the filter coefficient becomes almost "0", is assumed to be "0" in the filter characteristic in the time domain, which is obtained by inversely Fourier-transforming the window in the above frequency domain. Thus, the number of the multipliers MUL (m) in the feedback type FIR filter is reduced.

When the number of the multipliers MUL (m) is reduced by applying a window which does not satisfy the Prinsen- Bradley condition, an EVM (Error Vector Magnitude) characteristic, and a pre-error correction BER (Bit Error Rate) characteristic are greatly deteriorated.

Since the communication system according to the embodiment 2 applies the window satisfying the Prinsen-Bradley condition in the frequency domain, a PAPR reduction effect beyond those of the CI-OFDM system according to the related art 2 and the communication system according to the embodiment 1 is obtained.

Further, the communication system according to the embodiment 2 is capable of increasing average transmission power in the transmitter 10 by the reduction in PAPR. By increasing the average transmission power, a backoff value to be considered in a power amplifier can be reduced. This can lead to a reduction in the difficulty of design and a reduction in cost. Also, it is possible to cover a wider range (cable length and cell radius) by increasing the average transmission power. Further, the increase in the average transmission power enables an SNR (Signal to Noise Ratio) on the reception side to be improved and an improvement in throughput of the communication system to be achieved.

Besides, in the communication system according to the embodiment 2, since the number of the multipliers MUL (m) in the feedback type FIR filter is reduced as compared with the communication system according to the embodiment 1, it is possible to reduce the number of calculations of multiplication and addition.

Thus, it is possible to obtain a region in which the number of calculations can be more reduced than the number of calculations at which the CI-IFFT/CI-FFT processing and the IFFT/FFT processing in the CI-OFDM system according to the related art 2 are added together. Accordingly, it is possible to solve the problem at the application of the linear type FIR filter, i.e., the problem that the number of arithmetic operations and the processing load accompanying it become large.

Further, in the communication system according to the embodiment 2, the transmitter 10 and the receiver 20 are the same in terms of the filter coefficient of the feedback type FIR filter.

When the feedback type FIR filters (number of multipliers and filter coefficients) in the transmitter 10 and the receiver 20 are not matched, the EVM characteristic and the pre-error correction BER characteristic are deteriorated.

Since the feedback type FIR filters in the transmitter 10 and the receiver 20 are matched, the communication system according to the embodiment 2 is capable of avoiding deterioration in the EVM characteristic and pre-error correction BER characteristic.

<Concerned Points of Embodiment 2 and their Measures>

Although the communication system according to the embodiment 2 has one feature in that the number of the multipliers in the feedback type FIR filter is reduced, there is concern over the deterioration in the EVM characteristic and BER characteristic from this feature.

In the communication system according to the embodiment 2, however, the characteristics substantially equivalent to those of the CI-OFDM system according to the related art 2 can be ensured by clarifying the range causing no deterioration in the EVM characteristic and BER characteristic by simulation, experiments and the like.

As differences in characteristic between the communication system according to the embodiment 2 and the CI-OFDM system according to the related art 2, there are shown below execution results of simulation of the PAPR, the number of calculations, EVM, the pre-error correction BER characteristic.

<PAPR>

Table 1 shows the differences in PAPR between the communication system according to the embodiment 2 and the CI-OFDM system according to the related art 2. In Table 1, the number of multipliers in the feedback type FIR filter being the feature of the embodiment 2 is defined as a parameter. Also, Table 1 shows the amount of improvement in PAPR at which the PAPR of the communication system according to the embodiment 2 is improved from that of the CI-OFDM system according to the related art 2 for each modulation mode.

TABLE 1

| Modulation mode | Number of multipliers in feedback type FIR filter | | | |
|---|---|---|---|---|
| | 256 | 64 | 32 | 16 |
| BPSK | 0 [dB] | 0 [dB] | 0 [dB] | 0.15 [dB] |
| QPSK | 2.33 [dB] | 2.34 [dB] | 2.47 [dB] | 3.29 [dB] |
| 8PSK | 1.99 [dB] | 2.00 [dB] | 2.02 [dB] | 2.04 [dB] |
| 16 QAM | 0.81 [dB] | 0.81 [dB] | 0.83 [dB] | 1.44 [dB] |
| 64 QAM | 0.41 [dB] | 0.41 [dB] | 0.42 [dB] | 0.68 [dB] |
| 256 QAM | 0.37 [dB] | 0.37 [dB] | 0.37 [dB] | 0.53 [dB] |

As shown in Table 1, when the window satisfying the Prinsen-Bradley condition in the frequency domain, which is another feature of the embodiment 2 is applied, a PAPR reduction effect beyond that of the CI-OFDM system according to the related art 2 can be confirmed even when the number of multipliers is 256 (the number of reduction therein is 0).

Further, when the number of multipliers is reduced to 16, a further PAPR reduction effect is obtained.

<Number of Calculations>

Table 2 shows the values of the number of calculations for multiplication and addition in the transmission processing and the reception processing between the communication system according to the embodiment 2 and the CI-OFDM system according to the related art 2. Incidentally, in Table 2, the number of multipliers in the feedback type FIR filter indicative of being the feature of the embodiment 2 is defined as a parameter. N and M in Table are the values described in FIGS. 7B and 8B. The number of calculations in Table in the CI-OFDM system according to the related art 2 is a total value of the number of calculations of the CI-IFFT/CI-FFT and the number of calculations of the IFFT/FFT. Underlined spots in Table indicate spots at which the communication system according to the embodiment 2 is fewer in the number of calculations than the CI-OFDM system according to the related art 2.

TABLE 2

| | Number of multiplier in feedback type FIR filter | | | |
|---|---|---|---|---|
| | 256 | 64 | 32 | 16 |
| Embodiment 2 N = 16, M = 256 | 16384 | 4096 | 2048 | 1024 |
| CI-OFDM system of related art 2 | | 8488 | | |
| Embodiment 2 N = 32, M = 256 | 32768 | 8192 | 4096 | 2048 |
| CI-OFDM system of related art 2 | | 8832 | | |
| Embodiment 2 N = 64, M = 256 | 66536 | 16384 | 8192 | 4096 |
| CI-OFDM system of related art 2 | | 9728 | | |

TABLE 2-continued

| | Number of multiplier in feedback type FIR filter | | | |
|---|---|---|---|---|
| | 256 | 64 | 32 | 16 |
| Embodiment 2 N = 128, M = 512 | 262144 | 32768 | 16384 | 8192 |
| CI-OFDM system of related art 2 | | 22016 | | |

As shown in Table 2, it is understood that when the number of multipliers is set to 64 or 32 or less, the communication system according to the embodiment 2 is fewer in the number of calculations than the CI-OFDM system according to the related art 2.

Further, the number of multipliers taken as 256 in the embodiment 2 is equivalent to the number of calculations for the multiplication and addition in the embodiment 1.

<EVM>

Table 3 shows the values of EVM at BPSK modulation in the communication system according to the embodiment 2 and the communication system according to the embodiment 1. Incidentally, Table 3 shows as a parameter, the number of multipliers in the feedback type FIR filter indicative of being the feature of the embodiment 2. N and M in Table are the values described in FIGS. 7B and 8B. Underlined spots in Table indicate spots where EVM is degraded.

TABLE 3

| | | Number of multipliers in feedback type FIR filter | | |
|---|---|---|---|---|
| | | 256 | 64 | 32 | 16 |
| Embodiment 2 N = 32, M = 256 | Completely coincident with expected value | −48 [dB] | −44 [dB] | <u>−15 [dB]</u> |
| Embodiment 1 N = 32, M = 256 | Completely coincident with expected value | <u>−15 [dB]</u> | <u>−14 [dB]</u> | <u>−11 [dB]</u> |

Figure 18:
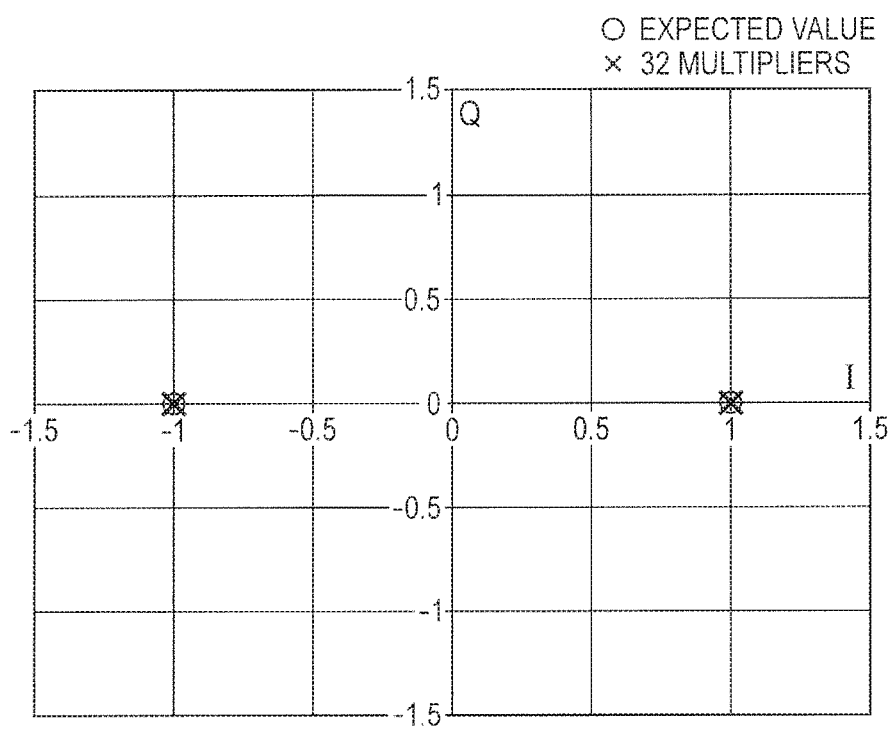
FIG. 18 is a diagram showing an example of an EVM characteristic at BPSK modulation where the number of multiplies is 32 in the communication system according to the embodiment 2.
Figure 19:
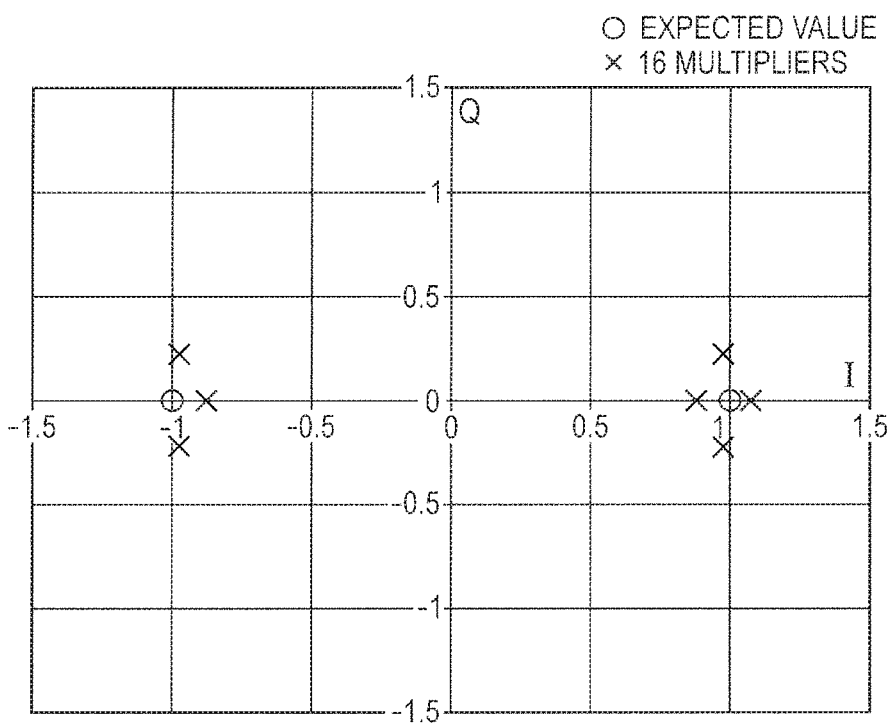
FIG. 19 is a diagram showing an example of an EVM characteristic at BPSK modulation where the number of multipliers is 16 in the communication system according to the embodiment 2.

Further, FIG. 17 shows the relation between the number of multipliers and EVM at BPSK modulation in the communication system according to the embodiment 2. Besides, FIG. 18 shows an EVM characteristic at BPSK modulation where the number of multiplies is 32 in the communication system according to the embodiment 2, and FIG. 19 shows an EVM characteristic at BPSK modulation where the number of multipliers is 16 in the communication system according to the embodiment 2. Incidentally, it can be said that in FIGS. 18 and 19, the EVM characteristic is satisfactory where ○ marks each indicative of an expected value and X marks each being an actual transmission point overlap with each other.

It is understood from Table 3 and FIG. 17 that in the embodiment 2, EVM is greatly degraded when the number of multipliers is defined as 16.

For example, in the IEEE (Institute of Electrical and Electronics Engineers). 802.11ac standard of the wireless LAN (Local Area Network), the specified value of EVM at BPSK modulation is −5 [dB] or less. FIG. 17 shows that when EVM is smaller than spec (black line), it satisfies the above specified value.

In the embodiment 2, EVM satisfies the above specified value even when the number of multipliers is defined as 16, and the EVM characteristic is deteriorated. From this point of view, it can be said that the number of multipliers can be reduced to 16.

It is also understood even from FIG. 19 that in the embodiment 2, the difference between the expected value and the actual transmission point is large when the number of multipliers is 16 (EVM is degraded).

On the other hand, in the case of the embodiment 1, it is understood that although EVM satisfies the specified value when the number of multipliers is defined as 64, the EVM characteristic is greatly deteriorated.

Table 4 shows the values of EVM at 256QAM modulation in the communication system according to the embodiment 2 and the communication system according to the embodiment 1. Incidentally, in Table 4, the number of multipliers in the feedback type FIR filter being the feature of the embodiment 2 is defined as a parameter. N and M in Table are the values described in FIGS. 7B and 8B. Underlined spot in Table indicate spots where EVM is degraded.

TABLE 4

| | | Number of multipliers in feedback type FIR filter | | | |
|---|---|---|---|---|---|
| | | 256 | 64 | 32 | 16 |
| Embodiment 2 N = 32, M = 256 | Completely coincident with expected value | −48 [dB] | −44 [dB] | <u>−15 [dB]</u> |
| Embodiment 1 N = 32, M = 256 | Completely coincident with expected value | <u>−14 [dB]</u> | <u>−11 [dB]</u> | <u>−9 [dB]</u> |

Figure 20:
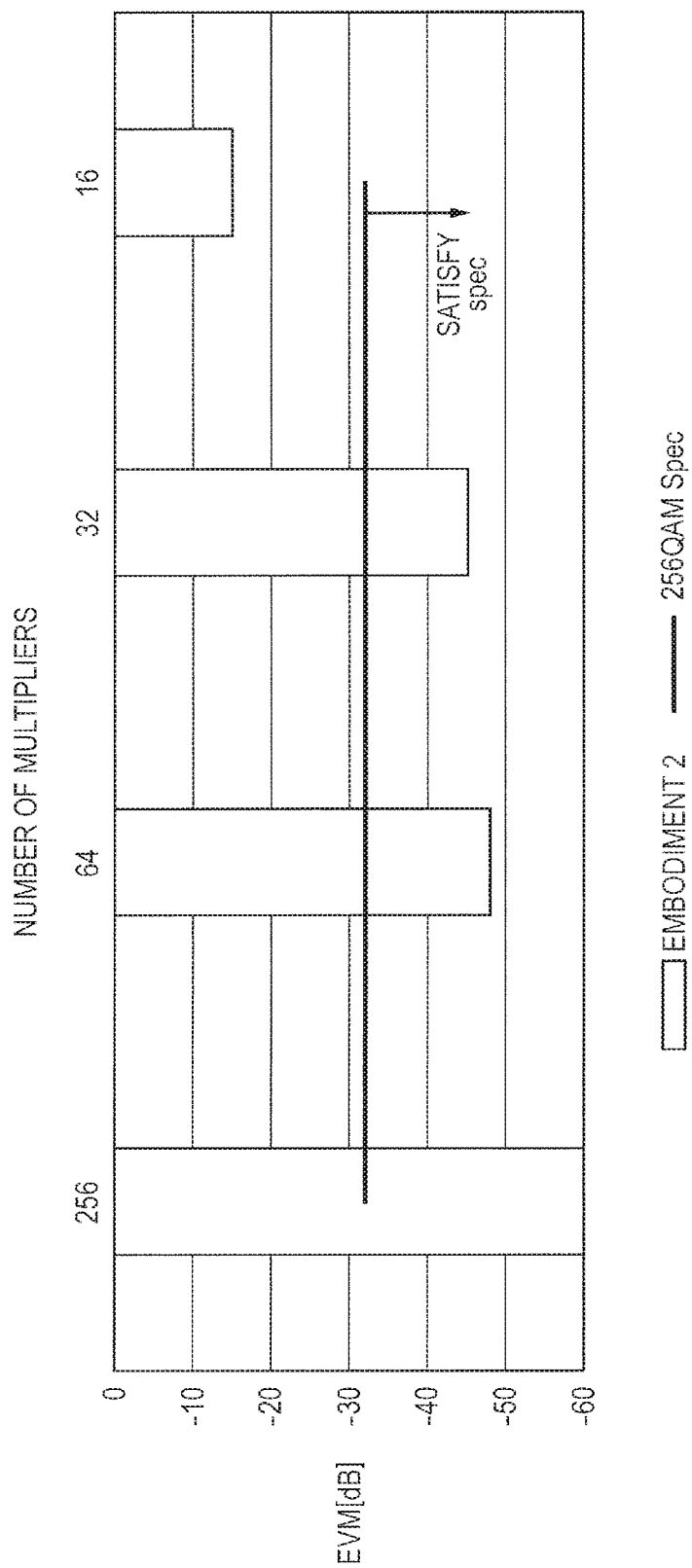
FIG. 20 is a diagram showing an example of the relation between the number of multipliers and EVM at 256QAM modulation in the communication system according to the embodiment 2.
Figure 21:
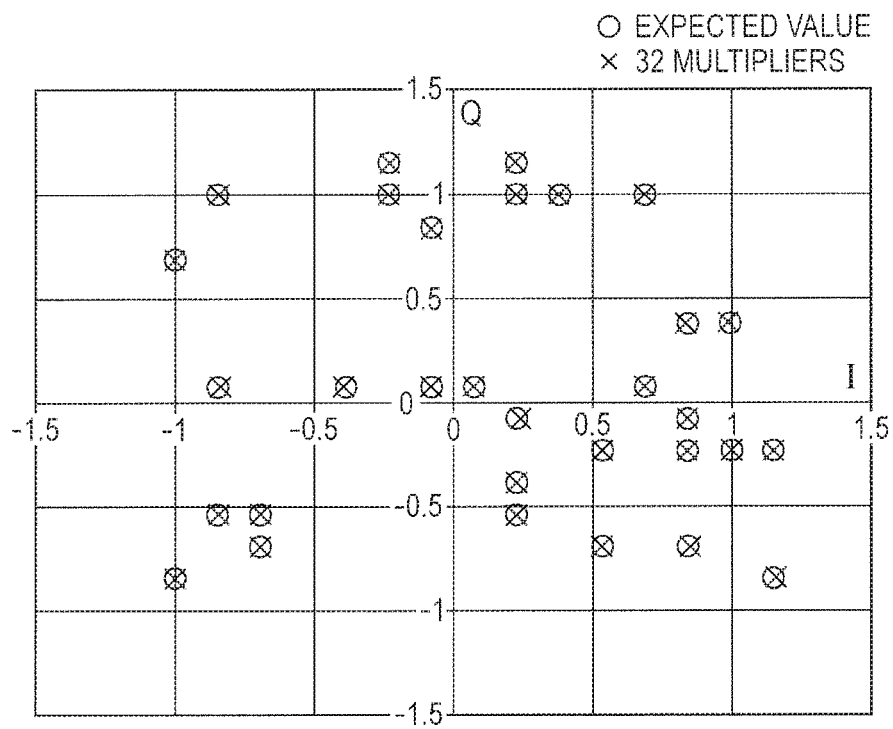
FIG. 21 is a diagram showing an example of an EVM characteristic at 256QAM modulation where the number of multipliers is 32 in the communication system according to the embodiment 2.
Figure 22:
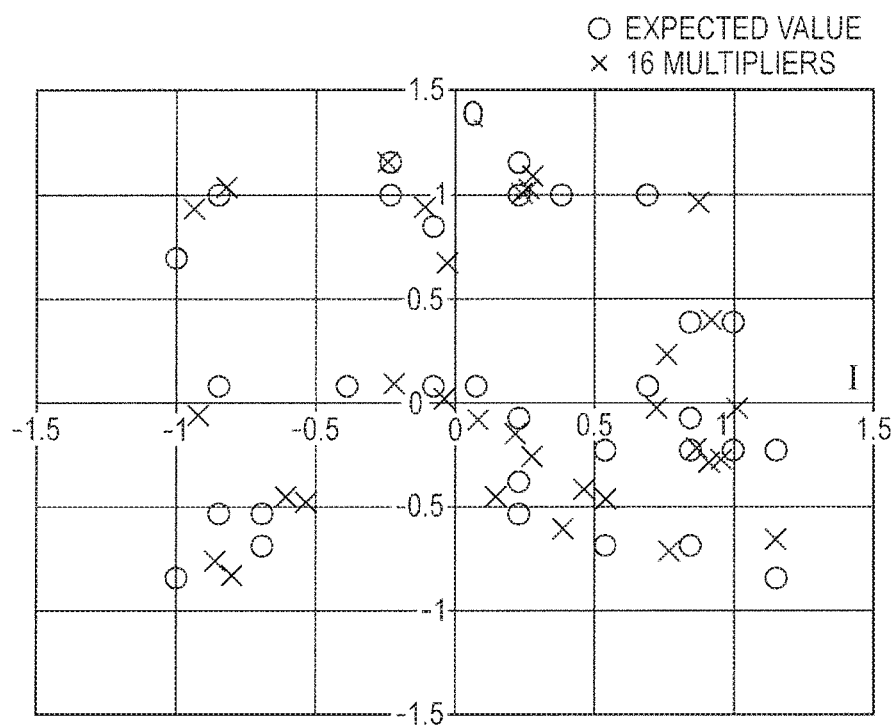
FIG. 22 is a diagram showing an example of an EVM characteristic at 256QAM modulation where the number of multipliers is 16 in the communication system according to the embodiment 2.

Further, FIG. 20 shows the relation between the number of multipliers and EVM at 256 QAM modulation in the communication system according to the embodiment 2. Further, FIG. 21 shows an EVM characteristic at 256QAM modulation where the number of multipliers is 32 in the communication system according to the embodiment 2, and FIG. 22 shows an EVM characteristic at 256QAM modulation where the number of multipliers is 16 in the communication system according to the embodiment 2. It can be said that in FIGS. 21 and 22, the EVM characteristic is satisfactory where ○ marks each indicative of an expected value and X marks each being an actual transmission point overlap with each other.

It is understood from Table 4 and FIG. 20 that in the embodiment 2, EVM is greatly degraded when the number of multipliers is defined as 16.

For example, in the IEEE. 802ac standard, the specified value of EVM at 256QAM modulation is −32 [dB] or less. FIG. 20 shows that when EVM is smaller than spec (black line), it satisfies the above specified value.

In the embodiment 2, when the number of multipliers is defined as 16, EVM does not satisfy the above specified value. It can be said from this point of view that the number of multipliers can be reduced to 32.

Further, it is understood even from FIG. 22 that in the embodiment 2, the difference between the expected value and the actual transmission point is large (EVM is degraded) when the number of multipliers is 16.

On the other hand, it is understood that in the embodiment 1, when the number of multipliers is defined as 64, the EVM characteristic is greatly deteriorated as with BPSK, and EVM cannot satisfy the specified value.

<Pre-Error Correction BER Characteristic>

Table 5 shows the difference in pre-error correction BER characteristic between the communication system according to the embodiment 2 and the CI-OFDM system according to the related art 2. In Table 5, the number of multipliers in the feedback type FIR filter being the feature of the embodiment 2 is defined as a parameter. Further, Table 5 shows the amount of deterioration in the pre-error correction BER characteristic at which the pre-error correction BER characteristic in the communication system according to the embodiment 2 is deteriorated from that of the CI-OFDM system according to the related art 2 for each modulation mode. N and M in Table are the values described in FIGS. 7B and 8B. Underlined spots in Table indicate spots where EVM is greatly degraded as compared with the CI-OFDM system according to the related art 2.

TABLE 5

| Modulation mode | Embodiment 2, N = 32, M = 256 Number of multipliers in feedback type FIR filter | | | |
|---|---|---|---|---|
| | 256 | 64 | 32 | 16 |
| BPSK | 0 | 0 | 0 | 0 |
| QPSK | 0 | 0 | 0 | 3 |
| 8PSK | 0 | 0 | 0 | 8 |
| 16 QAM | 0 | 0 | 0 | Floor in the vicinity of 0.002 (NO BER = 0 and greatly degraded) |
| 64 QAM | 0 | 0 | 0 | Floor in the vicinity of 0.4 (NO BER = 0 and greatly degraded) |
| 256QAM | 0 | 0 | 0 | Floor in the vicinity of 0.8 (NO BER = 0 and greatly degraded) |

Further, for comparison, Table 6 shows the difference in pre-error correction BER characteristic between the communication system according to the embodiment 1 and the CI-OFDM system according to the related art 2. The definition of Table 6 is similar to that of Table 5.

TABLE 6

| Modulation mode | Embodiment 1, N = 32, M = 256 Number of multipliers in feedback type FIR filter | | | |
|---|---|---|---|---|
| | 256 | 64 | 32 | 16 |
| BPSK | 0 | 0 | 0 | 0 |
| QPSK | 0 | 3 | 4.5 | 7 |
| 8PSK | 0 | Floor in the vicinity of 0.003 (NO BER = 0 and greatly deteriorated) | Floor in the vicinity of 0.06 (NO BER = 0 and greatly deteriorated) | Floor in the vicinity of 0.02 (NO BER = 0 and greatly deteriorated) |
| 16 QAM | 0 | Floor in the vicinity of 0.01 (NO BER = 0 and greatly deteriorated) | Floor in the vicinity of 0.1 (NO BER = 0 and greatly deteriorated) | Floor in the vicinity of 0.04 (NO BER = 0 and greatly deteriorated) |
| 64 QAM | 0 | Floor in the vicinity of 0.4 (NO BER = 0 and greatly deteriorated) | Floor in the vicinity of 0.6 (NO BER = 0 and greatly deteriorated) | Floor in the vicinity of 0.8 (NO BER = 0 and greatly deteriorated) |
| 256QAM | 0 | Floor in the vicinity of 0.8 (NO BER = 0 and greatly deteriorated) | Floor in the vicinity of 0.9 (NO BER = 0 and greatly deteriorated) | Floor in the vicinity of 0.9 (NO BER = 0 and greatly deteriorated) |

In view of Table 5, in the embodiment 2, when the number of multipliers is defined as 16, the pre-error correction BER characteristic is greatly deteriorated as viewed from the CI-OFDM system according to the related art 2. It can be said from this that the number of multipliers can be reduced to 32 free from deterioration in the characteristic.

On the other hand, it is understood from Table 6 that in the embodiment 1, when the number of multipliers is defined as 64, the characteristics other than at BPSK are greatly deteriorated.

Embodiment 3

An embodiment 3 aims to obtain a new effect by changing each filter coefficient of the feedback type FIR filter shown in FIGS. 9A and 9B on the basis of the configurations and operations of the embodiments 1 and 2. Changing the filter coefficient of the feedback type FIR filter shown in FIGS. 9A and 9B is equivalent to changing the filter characteristic in the frequency domain shown in each of FIGS. 10 and 14, i.e., changing the filter characteristic in the time domain.

<Configuration of Embodiment 3>

The embodiment 3 is similar in configuration to the embodiment 1 or 2 except that the filter coefficient of the feedback type FIR filter is changed.

Although there is mentioned here, for example, where the filter characteristic in the frequency domain is the rectangular window used in the embodiment 1, the number of multipliers can also be reduced by using the window to which the Prinsen-Bradley condition is used as in the embodiment 2.

<Method for Generating Filter Coefficient of Feedback Type FIR Filter>

Figure 23:
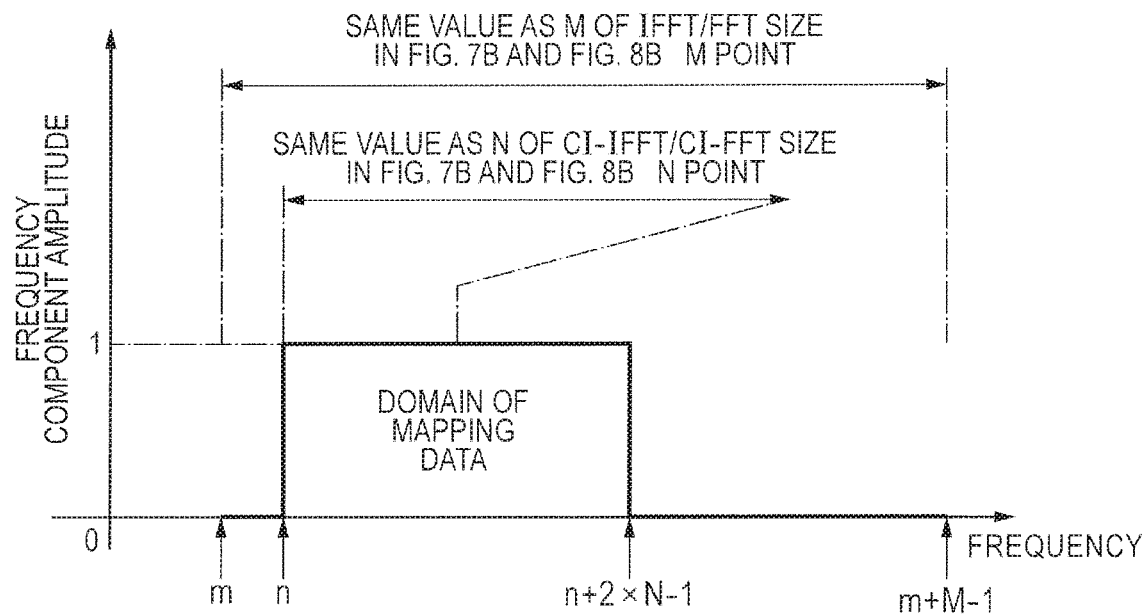
FIG. 23 is a diagram showing an example of a method for generating filter coefficients of a feedback type FIR filter in an embodiment 3.

FIG. 23 shows an example of a method for generating each filter coefficient of the feedback type FIR filter in the embodiment 3. The details of its generating method are similar to those in the embodiments 1 and 2.

As shown in FIG. 23, an FIR filter coefficient is generated from a filter characteristic in a time domain, which is obtained by defining N of the CI-IFFT/CI-FFT size in the CI-OFDM system according to the related art 2 shown in FIGS. 7B and 8B to be 2×N, changing a filter characteristic in a frequency domain, and inversely Fourier-transforming the same.

In the embodiment 3, the condition under which the IFFT/FFT size in the system is assumed to be an M point (frequency: m to m+M−1, and M is similar to the IFFT size M shown in FIGS. 7B and 8B) in the frequency domain is similar to the embodiments 1 and 2. In the embodiment 3, a domain corresponding to an N point, which is a domain mapping data is changed within the M point.

Incidentally, although a frequency band to be used is expanded with N as 2×N in FIG. 23, the frequency band to be used can also be reduced by setting N to 0.5×N. Further, a coefficient x (where x is a positive real number) which multiplies N is not limited to 2, 0.5, etc. described above, but may be an arbitrary value.

<Operation of Embodiment 3>

The communication system according to the embodiment 3 is similar in basic operation to the embodiments 1 and 2, but the following operations are added.

(D1) A communication network is configured of a master and a plurality of slaves. The slaves share a frequency band assigned as for the communication system. The transmitter 10 and the receiver 20 shown in FIG. 5 are equivalent to the salves. Therefore, the master is provided independently of the transmitter 10 and the receiver 20.

(D2) The master grasps the use situation of a frequency band and controls the slaves.

(D3) When an unused band exits in a usable frequency band, as shown in FIG. 23, the slave changes a filter characteristic in the frequency domain to thereby change a frequency band to be used (change a filter characteristic in a time domain), i.e., change a filter coefficient.

The above operations are predicated on the following operations.

(E1) The master notifies a frequency band used by the salve to the corresponding slave in advance by control information.

(E2) The communication system defines a pattern for the frequency band used by the salve, and the master and slaves respectively hold in advance a filter coefficient corresponding to the frequency band.

Specifically, in the case of the transmitter 10 shown in FIG. 5, which serves as the slave, the filter coefficient holding and setting unit 115 holds in advance a filter coefficient corresponding to a frequency band and sets the filter coefficient corresponding to the frequency band notified by the control information from the master to the transmission processing feedback type FIR filter 113.

Further, in the case of the receiver 20 shown in FIG. 6, which serves as the slave, the filter coefficient holding and setting unit 215 holds in advance a filter coefficient corresponding to a frequency band and sets the filter coefficient corresponding to the frequency band notified by the control information from the master to the reception processing feedback type FIR filter 213.

The master mostly leads the above operations and determines the frequency band to be used according to a communication status (amount of data to be transmitted by each slave, status of propagation path, or the like) of the communication system.

<Effects of Embodiment 3>

The communication system according to the embodiment 3 changes each filter coefficient of the feedback type FIR filter according to the communication status or the like.

Therefore, for example, the communication system is capable of expanding a frequency band to be used by one slave and transmitting/receiving data of the same modulation mode by using the expanded frequency band (with redundancy). Thus, an improvement in the reception characteristic on the reception side is expected. For example, in terms of the reception characteristic, an improvement of 3.0 [dB] is expected when N is defined as 2×N, and an improvement of 4.7 [dB] is expected when N is defined as 3×N, respectively.

Further, with the expansion of the frequency band to be used, the amount of data to be transmitted in a unit time is increased to make it possible to enhance a data rate. For example, when the same modulation mode is used for a data rate of one slave, the data rate can be improved to twice when N is defined as 2×N, and improved to three times when defined as 3×N, respectively.

Alternatively, it is possible to reduce the frequency band used by one slave and simultaneously increase the number of transmittable/receivable slaves. In this case, the data rate of one slave is degraded, but at the same time, the number of slaves targeted for transmitted/received can be increased, thereby making it possible to attain efficient control for the communication system.

<Application to Wired Network and Wireless Network>

Figure 24A:
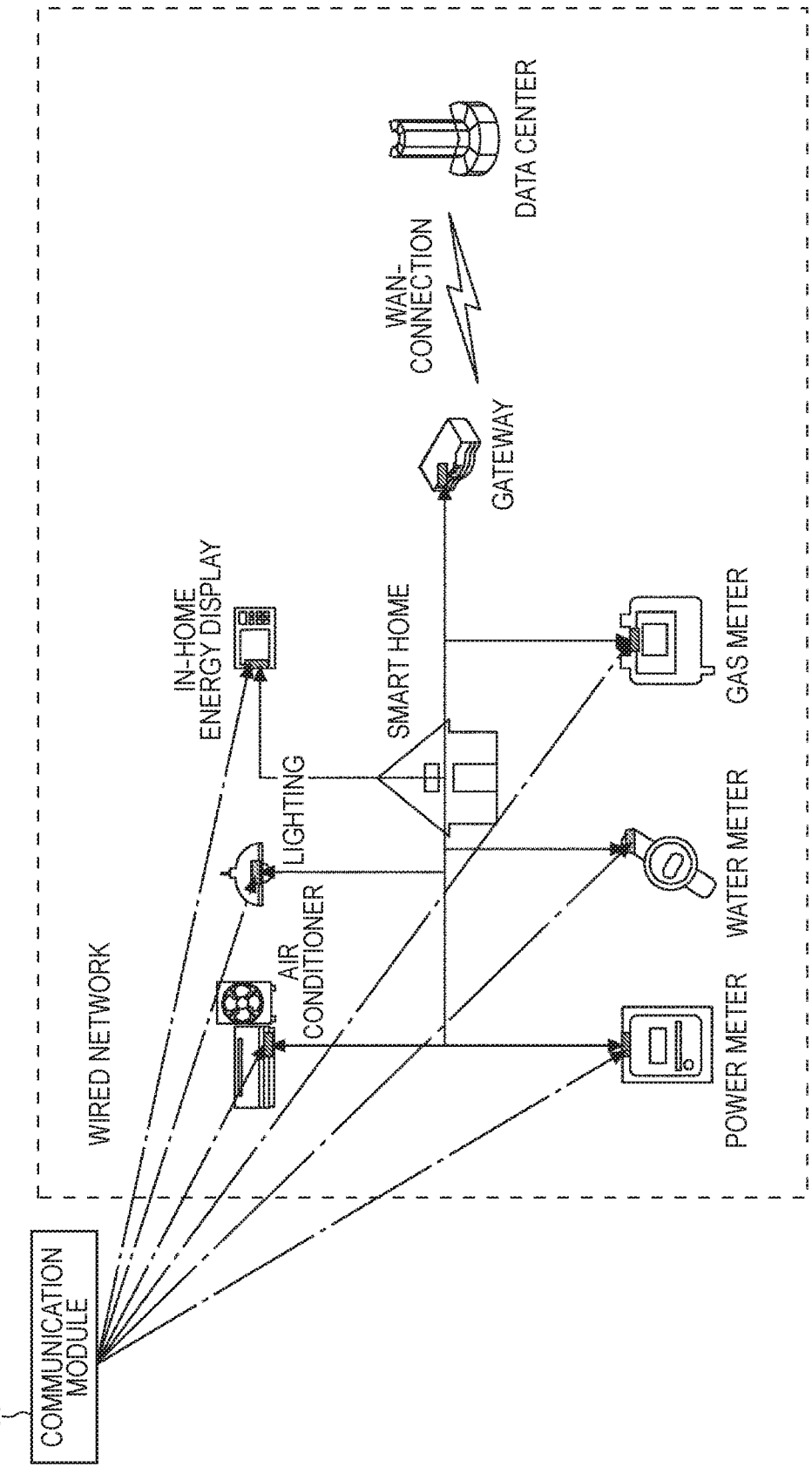
FIG. 24A is a diagram showing an example in which the communication systems according to the embodiments 1 through 3 are applied to a wired network.

The above-described embodiments 1 through 3 can be applied to a wired network such as a smart home network or the like shown in FIG. 24A, or a wireless network such as a cellular phone, a wireless LAN or the like shown in FIG. 24B.

<Wired Network>

As shown in FIG. 24A, a communication module 30 is a module including the transmitter 10 and the receiver 20 in any of the above-described embodiments 1 through 3. A power meter, a water meter, a gas meter, an air conditioner, a lighting, a household energy display, and a gateway are communication devices each equipped with the communication module 30.

The power meter, the water meter, the gas meter, the air conditioner, the lighting, and the household energy display are communicable with each other. The energy display for household use indicates the contents of data collected from the respective communication devices.

The power meter, the water meter, the gas meter, the air conditioner, the lighting, and the gateway are communicable with each other. A data center collects data from the respective communication devices in the smart home to perform targeted control (e.g., control of power supplying amount) through the gateway. Further, the data center can also remote-control the respective communication devices in the smart home through the gateway.

<Wireless Network>

As shown in FIG. 24B, a communication module 30 is a module including the transmitter 10 and the receiver 20 in any of the above-described embodiments 1 through 3. The cellular phone, a base station, a notebook personal computer, and an access point are communication devices each equipped with the communication module 30.

The cellular phone and the base station are communicable with each other. The cellular phone performs voice communication and data communication through the base station and a cellular phone network.

Further, the notebook personal computer and the access point are communicable with each other. The notebook personal computer performs data communication through the access point and a wireless LAN network.

<Modification of Embodiments 1 Through 3>

In the above-described embodiments, the transmitter and the receiver have been configured in such a manner that the filter coefficient holding and setting units hold in advance the generated filter coefficients and set the held filter coefficients to the transmission processing feedback type FIR filter and the reception processing feedback type FIR filter, respectively.

In the transmitter and the receiver, however, filter coefficient generating and setting units are provided in place of the filter coefficient holding and setting units. The filter coefficient generating and setting units may generate filter coefficients and set the generated filter coefficients to the transmission processing feedback type FIR filter and the reception processing feedback type FIR filter, respectively.

FIG. 25 shows a block diagram of a transmission/reception configuration of a communication system as a modification of the communication system according to each of the embodiments 1 through 3, which is equipped with filter coefficient generating and setting units 116 and 216 in place of the filter coefficient holding and setting units 115 and 215.

The filter coefficient generating and setting unit 116 generates a filter coefficient and sets the generated filter coefficient to the transmission processing feedback type FIR filter 113. The filter coefficient generating and setting unit 216 generates a filter coefficient and sets the generated filter coefficient to the reception processing feedback type FIR filter 213.

The filter coefficient generating and setting units 116 and 216 may generate the filter coefficients of the feedback type FIR filters by using any of the filter coefficient generating methods shown in FIGS. 10, 14, and 23. Incidentally, in the case of the filter coefficient generating method shown in FIG. 23, the filter coefficient generating and setting units 116 and 216 may respectively determine a coefficient x multiplying N according to the frequency band notified from the master.

<Concept of Embodiments 1 Through 3>

Figure 26:
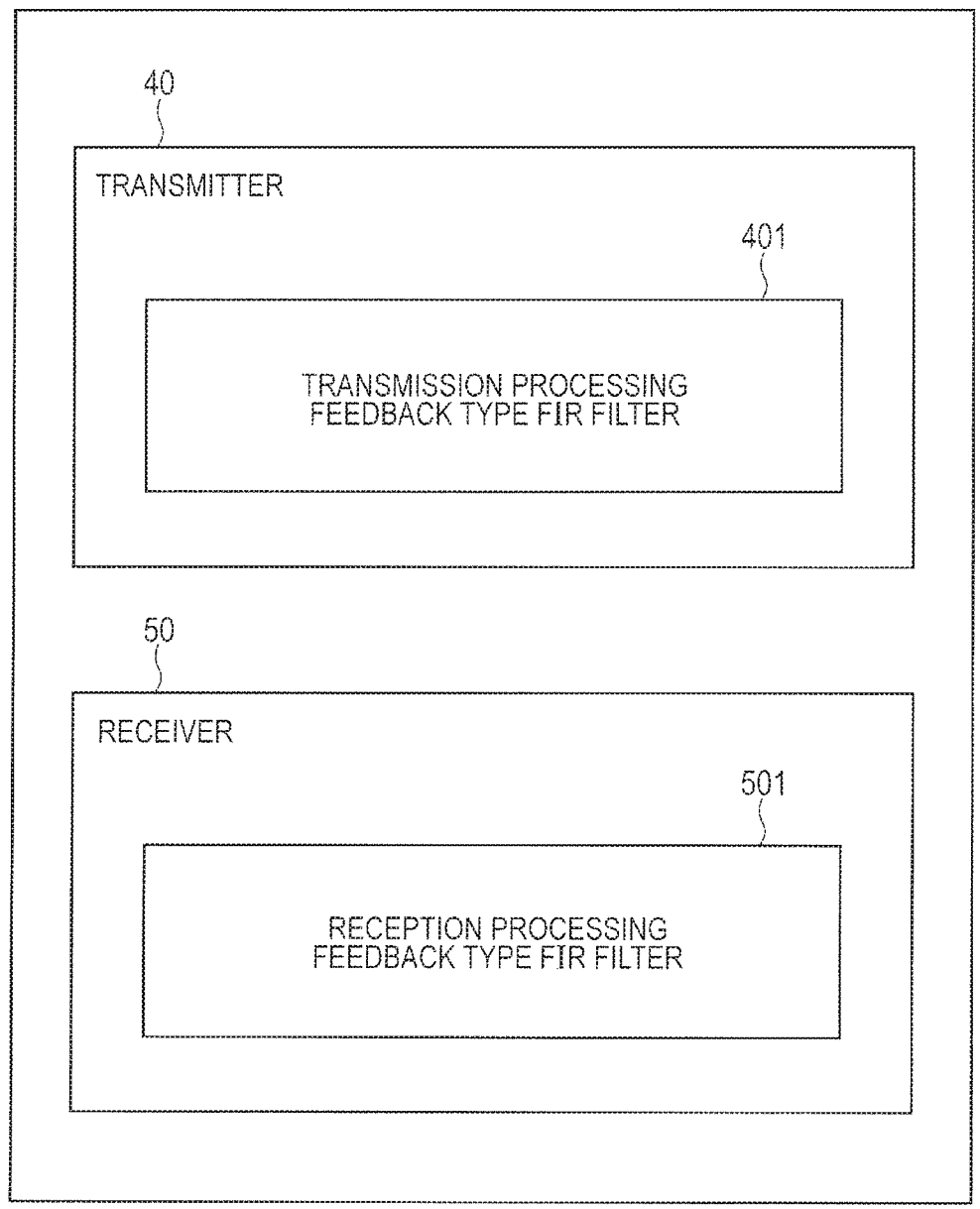
FIG. 26 is a block diagram showing an example of a transmission/reception configuration of a communication system conceptually showing each of the embodiments 1 through 3.

FIG. 26 shows a block diagram of a transmission/reception configuration of a communication system conceptually showing each of the embodiments 1 through 3.

The communication system shown in FIG. 26 is equipped with a transmitter 40 and a receiver 50.

The transmitter 40 is equipped with a transmission processing feedback type FIR filter 401. The transmission processing feedback type FIR filter 401 corresponds to the transmission processing feedback type FIR filter 113.

The receiver 50 is equipped with a reception processing feedback type FIR filter 501. The reception processing feedback type FIR filter 501 corresponds to the reception processing feedback type FIR filter 213.

Each of the transmission processing feedback type FIR filter 401 and the reception processing feedback type FIR filter 501 is configured to feed back data outputted from the last stage delay element of a plurality of delay elements included in the FIR filter to the first stage delay element and configured to set an initial value to a delay element in a predetermined position, of the plural delay elements (refer to FIGS. 9A, 9B, 13A, and 13B).

The transmitter 40 performs transmission processing using the transmission processing feedback type FIR filter 401. The transmission processing is specifically processing equivalent to CI-IFFT and IFFT.

The receiver 50 performs reception processing using the reception processing feedback type FIR filter 501. The reception processing is specifically processing equivalent to FFT and CI-FFT.

The communication system shown in FIG. 26 realizes processing equivalent to the CI-IFFT/CI-FFT and IFFT/FFT in the CI-OFDM system according to the related art 2 by the feedback type FIR filters. Therefore, a PAPR reduction effect by the CI code is obtained in a manner similar to the CI-OFDM system according to the related art 2.

Further, since the PAPR reduction effect equivalent to that of the CI-OFDM system according to the related art 2 is obtained with a simple configuration using the feedback type FIR filters, a problem at the IFFT/FFT application can be solved. That is, it is possible to reduce a hardware circuit scale and a memory capacity.

Although the invention made above by the present inventors has been described specifically on the basis of the preferred embodiments, the present invention is not limited to the already-described embodiments. It is needless to say that various changes can be made thereto within the scope not departing from the gist thereof.

Further, in the above embodiments, the respective elements described in the drawings as functional blocks performing various processing can be configured by a CPU (Central Processing Unit), a memory, and other circuits in terms of hardware and are realized by programs or the like loaded in a memory in terms of software. Accordingly, it can be understood by a person skilled in the art that these functional blocks can be realized in various forms by only hardware, only software or their combination. The functional blocks are not limited to any of them.

Furthermore, the above programs can be stored using various types of non-transitory computer readable mediums and supplied to a computer. The non-transitory computer readable mediums include various types of tangible storage mediums. Examples of the non-transitory computer readable mediums include a magnetic recording medium (e.g., flexible disk, magnetic tape, hard disk drive), a magnetooptical recording medium (e.g., magnetooptical disk), a CD-ROM (Compact Disc-Read Only Memory), a CD-R (CD-Readable), a CD-R/W (CD-ReWritable), and a semiconductor memory (e.g., mask ROM, PROM (Programmable ROM), EPROM (Erasable PROM), flash ROM, RAM (Random Access Memory)). Further, the programs may be supplied to the computer by various types of transitory computer readable mediums. Examples of the transitory computer readable mediums include an electric signal, an optical signal, and electromagnetic waves. The transitory computer readable medium is capable of supplying a program to the computer through a wired communication path such as a wire and an optical fiber or the like, or a wireless communication path.

Some or all of the above embodiments and exemplary embodiments can be also described as in the following appendices, but are not limited to the following.

APPENDIX 1

A communication method suitable for use in a communication system including a transmitter and a receiver,
in which the transmitter includes:
a transmission processing feedback type FIR filter configured to feed back data outputted from the last stage delay element of a plurality of delay elements included in an FIR (Finite Impulse Response) filter to the first stage delay element and configured to set an initial value to a delay element in a predetermined position, of the delay elements,
in which the transmitter performs transmission processing by using the transmission processing feedback type FIR filter,
in which the receiver includes:
a reception processing feedback type FIR filter configured similarly to the transmission processing feedback type FIR filter, and in which the receiver performs reception processing by using the reception processing feedback type FIR filter.

APPENDIX 2

The communication method described in the appendix 1, in which the transmission processing is processing equivalent to CI-IFFT being CI (Carrier Interferometry) encoding by IFFT (Inverse Fast Fourier Transform), and IFFT, and in which the reception processing is processing equivalent to FFT and CI-FFT being decoding of a CI code by FFT.

APPENDIX 3

The communication method described in the appendix 2, in which the transmission processing feedback type FIR filter includes first and second feedback type FIR filters, in which the reception processing feedback type FIR filter includes third and fourth feedback type FIR filters, and in which when a CI-IFFT/CI-FFT size is assumed to be N (where N is a positive integer of 2 or more), and an IFFT/FFT size is assumed to be M (N<M, and M is a positive integer of 2 or more), the first through fourth feedback type FIR filters respectively include:

M pieces of the delay elements cascade-connected to each other and configured to connect an output of the last stage delay element to an input of the first stage delay element, M pieces of multipliers respectively provided corresponding to the M pieces of delay elements and multiplying data outputted from the corresponding delay elements and filter coefficients, and M pieces of adders respectively provided corresponding to the M pieces of multipliers and configured to add data outputted from the corresponding multipliers and data outputted from the multipliers in stages previous to the corresponding multipliers.

APPENDIX 4

The communication method described in the appendix 3, in which the first through fourth feedback type FIR filters respectively perform switching to a cutoff state of cutting off a connection between the M pieces of delay elements, respectively set an initial value to the delay element in a predetermined position, of the M pieces of delay elements and set "0" to other delay elements, respectively perform switching to a connection state of cascade-connecting the M pieces of delay elements and connecting an output of the last stage delay element to an input of the first stage delay element, and respectively perform M times, shift processing of outputting data inputted to each of the delay elements other than the last stage delay element to the next stage delay element and feeding back data inputted to the last stage delay element to the first stage delay element.

APPENDIX 5

The communication method described in the appendix 4, in which the transmitter performs encoding processing on a transmission data sequence, digital-modulates the transmission data sequence subjected to the encoding processing, separates the digital-modulated transmission data sequence into an I component and a Q component, outputs the I component of the transmission data sequence to the first feedback type FIR filter, and outputs the Q component of the transmission data sequence to the second feedback type FIR filter, add a CP (Cyclic Prefix) to the head of the transmission data sequence outputted from the transmission processing feedback type FIR filter, and transmits the transmission data sequence added with the CP by wireless or wire, in which after the shift processing of M times by the first and second feedback type FIR filters, the transmission processing feedback type FIR filter generates a transmission data sequence corresponding to data outputted every shift processing of M times from the last stage adders of the first and second feedback type FIR filters, and outputs the generated transmission data sequence, in which the receiver receives a reception data sequence by wireless or wire, deletes the CP added to the head of the received reception data sequence and outputs the CP-deleted reception data sequence to the third and fourth feedback type FIR filters, synthesizes I and Q components of the reception data sequence outputted from the reception processing feedback type FIR filter, digital-demodulates the reception data sequence whose I and Q components are synthesized, and performs decoding processing on the digital-demodulated reception data sequence, and in which the reception processing feedback type FIR filter outputs, every shift processing of M times in the third and fourth feedback type FIR filters, data outputted from the last stage adder of the third feedback type FIR filter as the I component of the reception data sequence and outputs data outputted from the last stage adder of the fourth feedback type FIR filter as the Q component of the reception data sequence, respectively.

APPENDIX 6

The communication method described in the appendix 3, in which the transmitter generates respective filter coefficients of the M pieces of multipliers in the first and second feedback type FIR filters on the basis of a filter characteristic in a time domain, which is obtained by inversely Fourier-transforming a window in a frequency domain, and sets the generated filter coefficients to the M pieces of multipliers in the first and second feedback type FIR filters respectively, and in which the receiver generates respective filter coefficients of the M pieces of multipliers in the third and fourth feedback type FIR filters on the basis of a filter characteristic in a time domain, which is obtained by inversely Fourier-transforming a window in a frequency domain, and sets the generated filter coefficients to the M pieces of multipliers in the third and fourth feedback type FIR filters respectively.

APPENDIX 7

The communication system described in the appendix 6, in which the window is a rectangular window in which a domain equivalent to an N point is assumed to be "1", and domains other than the domain are assumed to be "0" within a domain equivalent to an M point in the frequency domain.

APPENDIX 8

The communication method described in the appendix 6, in which the window is a window in which a Prinsen- Bradley condition is applied to both ends of a rectangular window in which a domain equivalent to an N point is assumed to be "1", and domains other than the domain are assumed to be "0" within a domain equivalent to an M point in a frequency domain.

APPENDIX 9

The communication method described in the appendix 6, in which the window is a rectangular window in which a domain equivalent to an (N×x) point where N is multiplied by a coefficient x (where x is a positive real number) is assumed to be "1", and domains other than the domain are assumed to be "0" within a domain equivalent to an M point in a frequency domain.

APPENDIX 10

The communication method described in the appendix 9, in which the transmitter and the receiver respectively determine a coefficient x according to frequency bands used in the transmitter and the receiver.

APPENDIX 11

The communication method described in the appendix 10, in which the transmitter and the receiver are notified of the frequency bands used in the transmitter and the receiver in advance from the outside.

APPENDIX 12

The communication method described in the appendix 3, in which the transmitter holds in advance the respective filter coefficients of the M pieces of multipliers in the first and second feedback type FIR filters, and sets the held filter coefficients to the M pieces of multipliers in the first and second feedback type FIR filters respectively, and in which the receiver holds in advance the respective filter coefficients of the M pieces of multipliers in the third and fourth feedback type FIR filters, and sets the held filter coefficients to the M pieces of multipliers in the third and fourth feedback type FIR filters respectively.

APPENDIX 13

The communication method described in the appendix 12, in which the transmitter holds in advance the respective filter coefficients corresponding to a frequency band, of the M pieces of multipliers in the first and second feedback type FIR filters, and sets the respective filter coefficients corresponding to the frequency band used in the transmitter, of the M pieces of multipliers in the first and second feedback type FIR filters to the M pieces of multipliers in the first and second feedback type FIR filters respectively, and in which the receiver holds in advance the respective filter coefficients corresponding to the frequency band, of the M pieces of multipliers in the third and fourth feedback type FIR filters, and sets the respective filter coefficients corresponding to the frequency band used in the receiver, of the M pieces of multipliers in the third and fourth feedback type FIR filters to the M pieces of multipliers in the third and fourth feedback type FIR filters respectively.

APPENDIX 14

The communication method described in the appendix 13, in which the transmitter is notified of the frequency band used in the transmitter in advance from the outside, and in which the receiver is notified of the frequency band used in the receiver in advance from the outside.

APPENDIX 15

The communication method described in the appendix 3, in which the transmitter defines filter coefficients of the arbitrary multipliers in the M pieces of multipliers in the first and second feedback type FIR filters to be "0", and in which the receiver defines filter coefficients of the arbitrary multipliers in the M pieces of multipliers in the third and fourth feedback type FIR filters to be "0".

What is claimed is:

1. A transmitter comprising:
   a transmission processing feedback type FIR filter configured to feed back data outputted from the last stage delay element of a plurality of delay elements included in an FIR (Finite Impulse Response) filter to the first stage delay element,
   wherein the transmitter processing feedback type FIR filter is configured to set an initial value to the delay element in a predetermined position of the delay elements,
   the transmitter further comprises:
      an encoder which performs encoding processing on a transmission data sequence;
      a symbol mapper which digital-modulates the transmission data sequence outputted from the encoder;
      an IQ separation unit which separates the transmission data sequence outputted from the symbol mapper into an I component and a Q component;
      a first feedback type FIR filter; and
      a second feedback type FIR filter, and
   wherein the IQ separation unit outputs the I component of the transmission data sequence to the first feedback type FIR filter, and outputs the Q component of the transmission data sequence to the second feedback type FIR filter.

2. The communication device comprising a communication module including the transmitter according to claim 1.

3. A communication system comprising:
   a transmitter and a receiver,
   wherein the transmitter includes:
   a transmission processing feedback type FIR filter configured to feed back data outputted from the last stage delay element of a plurality of delay elements included in an FIR (Finite Impulse Response) filter to the first stage delay element and configured to set an initial value to a delay element in a predetermined position, of the delay elements
   wherein the transmitter performs transmission processing by using the transmission processing feedback type FIR filter,
   wherein the receiver includes:
   a reception processing feedback type FIR filter configured similarly to the transmission processing feedback type FIR filter, and
   wherein the receiver performs reception processing by using the reception processing feedback type FIR filter.

4. The communication system according to claim 3,
wherein the transmission processing is processing equivalent to CI-IFFT being CI (Carrier Interferometry) encoding by IFFT (Inverse Fast Fourier Transform), and IFFT, and
wherein the reception processing is processing equivalent to FFT and CI-FFT being decoding of a CI code by FFT.

5. The communication system according to claim 4,
wherein the transmission processing feedback type FIR filter includes first and second feedback type FIR filters,
wherein the reception processing feedback type FIR filter includes third and fourth feedback type FIR filters, and
wherein when a CI-IFFT/CI-FFT size is assumed to be N (where N is a positive integer of 2 or more), and an IFFT/FFT size is assumed to be M (N<M, and M is a positive integer of 2 or more), the first through fourth feedback type FIR filters respectively include:
M pieces of the delay elements cascade-connected to each other and configured to connect an output of the last stage delay element to an input of the first stage delay element;
M pieces of multipliers respectively provided corresponding to the M pieces of delay elements and configured to multiply data outputted from the corresponding delay elements and filter coefficients; and
M pieces of adders respectively provided corresponding to the M pieces of multipliers and configured to add data outputted from the corresponding multipliers and data outputted from the multipliers in stages previous to the corresponding multipliers.

6. The communication system according to claim 5,
wherein the first through fourth feedback type FIR filters respectively further include switches for switching between a connection state of cascade-connecting the M pieces of delay elements and connecting an output of the last stage delay element to an input of the first stage delay element and a cutoff state of cutting off a connection between the M pieces of delay elements,
wherein the first through fourth feedback type FIR filters respectively perform switching to the cutoff state through the switches,
wherein the first through fourth feedback type FIR filters respectively set an initial value to the delay element in a predetermined position, of the M pieces of delay elements and set "0" to other delay elements,
wherein the first through fourth feedback type FIR filters respectively perform switching to the connection state through the switches, and
wherein the first through fourth feedback type FIR filters respectively perform M times, shift processing of outputting data inputted to each of the delay elements other than the last stage delay element to the next stage delay element and feeding back data inputted to the last stage delay element to the first stage delay element.

7. The communication system according to claim 6,
wherein the transmitter includes:
an encoder which performs encoding processing on a transmission data sequence;
a symbol mapper which digital-modulates the transmission data sequence outputted from the encoder;
an IQ separation unit which separates the transmission data sequence outputted from the symbol mapper into an I component and a Q component, outputs the I component of the transmission data sequence to the first feedback type FIR filter, and outputs the Q component of the transmission data sequence to the second feedback type FIR filter;
an add CP unit which adds a CP (Cyclic Prefix) to the head of the transmission data sequence outputted from the transmission processing feedback type FIR filter; and
a TX unit which transmits the transmission data sequence outputted from the add CP unit by wireless or wire,
wherein after the shift processing of M times by the first and second feedback type FIR filters, the transmission processing feedback type FIR filter generates a transmission data sequence corresponding to data outputted every shift processing of M times from the last stage adders of the first and second feedback type FIR filters, and outputs the generated transmission data sequence to the add CP unit,
wherein the receiver includes:
an RX unit which receives a reception data sequence by wireless or wire;
a delete CP unit which deletes the CP added to the head of the reception data sequence outputted from the RX unit and outputs the CP-deleted reception data sequence to the third and fourth feedback type FIR filters;
an IQ synthesis unit which synthesizes I and Q components of the reception data sequence outputted from the reception processing feedback type FIR filter;
a symbol de-mapper which digital-demodulates the reception data sequence outputted from the IQ synthesis unit; and
a decoder which performs decoding processing on the reception data sequence outputted from the symbol de-mapper, and
wherein the reception processing feedback type FIR filter outputs, every shift processing of M times in the third and fourth feedback type FIR filters, data outputted from the last stage adder of the third feedback type FIR filter to the IQ synthesis unit as the I component of the reception data sequence and outputs data outputted from the last stage adder of the fourth feedback type FIR filter to the IQ synthesis unit as the Q component of the reception data sequence, respectively.

8. The communication system according to claim 5,
wherein the transmitter includes a first filter coefficient generating and setting unit which generates respective filter coefficients of the M pieces of multipliers in the first and second feedback type FIR filters on the basis of a filter characteristic in a time domain, which is obtained by inversely Fourier-transforming a window in a frequency domain, and sets the generated filter coefficients to the M pieces of multipliers in the first and second feedback type FIR filters respectively, and
wherein the receiver includes a second filter coefficient generating and setting unit which generates respective filter coefficients of the M pieces of multipliers in the third and fourth feedback type FIR filters on the basis of a filter characteristic in a time domain, which is obtained by inversely Fourier-transforming a window in a frequency domain, and sets the generated filter coefficients to the M pieces of multipliers in the third and fourth feedback type FIR filters respectively.

9. The communication system according to claim 8,
wherein the window is a rectangular window in which a domain equivalent to an N point is assumed to be "1", and domains other than the domain are assumed to be "0", within a domain equivalent to an M point in the frequency domain.

10. The communication system according to claim 1,
wherein the transmitter includes a first filter coefficient holding and setting unit which holds in advance the respective filter coefficients of the M pieces of multipliers in the first and second feedback type FIR filters, and sets the held filter coefficients to the M pieces of multipliers in the first and second feedback type FIR filters respectively, and
wherein the receiver includes a second filter coefficient holding and setting unit which holds in advance the respective filter coefficients of the M pieces of multipliers in the third and fourth feedback type FIR filters, and sets the held filter coefficients to the M pieces of multipliers in the third and fourth feedback type FIR filters respectively.

11. The communication system according to claim 10,
wherein the first filter coefficient holding and setting unit holds in advance the respective filter coefficients corresponding to a frequency band, of the M pieces of multipliers in the first and second feedback type FIR filters,
wherein the first filter coefficient holding and setting unit sets the respective filter coefficients corresponding to the frequency band used in the transmitter, of the M pieces of multipliers in the first and second feedback type FIR filters to the M pieces of multipliers in the first and second feedback type FIR filters respectively,
wherein the second filter coefficient holding and setting unit holds in advance the respective filter coefficients corresponding to a frequency band, of the M pieces of multipliers in the third and fourth feedback type FIR filters, and
wherein the second filter coefficient holding and setting unit sets the respective filter coefficients corresponding to the frequency band used in the receiver, of the M pieces of multipliers in the third and fourth feedback type FIR filters to the M pieces of multipliers in the third and fourth feedback type FIR filters respectively.

12. The communication system according to claim 11,
wherein the transmitter is notified of the frequency band used in the transmitter in advance from the outside, and
wherein the receiver is notified of the frequency band used in the receiver in advance from the outside.

13. A communication device comprising a communication module including a transmitter and a receiver according to claim 3.

14. A communication method suitable for use in a communication system including a transmitter and a receiver, comprising the steps of:
causing the transmitter to have a transmission processing feedback type FIR filter configured to feed back data outputted from the last stage delay element of a plurality of delay elements included in an FIR (Finite Impulse Response) filter to the first stage delay element and configured to set an initial value to a delay element in a predetermined position, of the delay elements,
causing the transmitter to perform transmission processing by using the transmission processing feedback type FIR filter,
causing the receiver to have a reception processing feedback type FIR filter configured similarly to the transmission processing feedback type FIR filter, and
causing the receiver to perform reception processing by using the reception processing feedback type FIR filter.

15. The communication method according to claim 14,
wherein the transmission processing is processing equivalent to CI-IFFT being CI (Carrier Interferometry) encoding by IFFT (Inverse Fast Fourier Transform), and IFFT, and
wherein the reception processing is processing equivalent to FFT and CI-FFT being decoding of a CI code by FFT.

16. The communication method according to claim 15,
wherein the transmission processing feedback type FIR filter includes first and second feedback type FIR filters,
wherein the reception processing feedback type FIR filter includes third and fourth feedback type FIR filters, and
wherein when a CI-IFFT/CI-FFT size is assumed to be N (where N is a positive integer of 2 or more), and an IFFT/FFT size is assumed to be M (N<M, and M is a positive integer of 2 or more), the first through fourth feedback type FIR filters respectively include:
M pieces of the delay elements cascade-connected to each other and configured to connect an output of the last stage delay element to an input of the first stage delay element;
M pieces of multipliers respectively provided corresponding to the M pieces of delay elements and configured to multiply data outputted from the corresponding delay elements and filter coefficients; and
M pieces of adders respectively provided corresponding to the M pieces of multipliers and configured to add data outputted from the corresponding multipliers and data outputted from the multipliers in stages previous to the corresponding multipliers.

17. The communication method according to claim 16,
wherein the first through fourth feedback type FIR filters respectively perform switching to a cutoff state of cutting off a connection between the M pieces of delay elements,
wherein the first through fourth feedback type FIR filters respectively set an initial value to the delay element in a predetermined position, of the M pieces of delay elements and set "0" to other delay elements,
wherein the first through fourth feedback type FIR filter respectively perform switching to a connection state of cascade-connecting the M pieces of delay elements and connecting an output of the last stage delay element to an input of the first stage delay element, and
wherein the first through fourth feedback type FIR filter respectively perform M times, shift processing of outputting data inputted to each of the delay elements other than the last stage delay element to the next stage delay element and feeding back data inputted to the last stage delay element to the first stage delay element.

18. The communication method according to claim 17,
wherein the transmitter performs encoding processing on a transmission data sequence,
wherein the transmitter digital-modulates the transmission data sequence subjected to the encoding processing,
wherein the transmitter separates the digital-modulated transmission data sequence into an I component and a Q component, outputs the I component of the transmission data sequence to the first feedback type FIR filter, and outputs the Q component of the transmission data sequence to the second feedback type FIR filter,
wherein the transmitter adds a CP (Cyclic Prefix) to the head of the transmission data sequence outputted from the transmission processing feedback type FIR filter, wherein the transmitter transmits the transmission data sequence added with the CP by wireless or wire, wherein after the shift processing of M times by the first and second feedback type FIR filters, the transmission processing feedback type FIR filter generates a transmission data sequence corresponding to data outputted every shift processing of M times from the last stage adders in the first and second feedback type FIR filters, and outputs the generated transmission data sequence, wherein the receiver receives a reception data sequence by wireless or wire, wherein the receiver deletes the CP added to the head of the received reception data sequence and outputs the CP-deleted reception data sequence to the third and fourth feedback type FIR filters, wherein the receiver synthesizes I and Q components of the reception data sequence outputted from the reception processing feedback type FIR filter, wherein the receiver digital-demodulates the reception data sequence whose I and Q components are synthesized, wherein the receiver performs decoding processing on the digital-demodulated reception data sequence, and wherein the reception processing feedback type FIR filter outputs, every shift processing of M times in the third and fourth feedback type FIR filters, data outputted from the last stage adder of the third feedback type FIR filter as the I component of the reception data sequence and outputs data outputted from the last stage adder of the fourth feedback type FIR filter as the Q component of the reception data sequence, respectively.

* * * * *